(12) United States Patent
Son et al.

(10) Patent No.: US 12,189,092 B2
(45) Date of Patent: Jan. 7, 2025

(54) OPTICAL IMAGING SYSTEM INCLUDING SIX LENSES OF +---++, OR SEVEN LENSES OF --+-++-, +-+---+ +, -++-+-- or -++-++- REFRACTIVE POWERS

(71) Applicant: Samsung Electro-Mechanics Co., Ltd., Suwon-si (KR)

(72) Inventors: Ju Hwa Son, Suwon-si (KR); Hyo Jin Hwang, Suwon-si (KR); Yong Joo Jo, Suwon-si (KR); Sang Hyun Jang, Suwon-si (KR); Jong Gi Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 18/074,881

(22) Filed: Dec. 5, 2022

(65) Prior Publication Data
US 2023/0108823 A1 Apr. 6, 2023

Related U.S. Application Data

(63) Continuation of application No. 17/005,918, filed on Aug. 28, 2020, now Pat. No. 11,803,034.

(30) Foreign Application Priority Data

Aug. 30, 2019 (KR) .......................... 10-2019-0107776

(51) Int. Cl.
*G02B 13/00* (2006.01)
*G02B 9/64* (2006.01)
(Continued)

(52) U.S. Cl.
CPC ........... *G02B 13/0045* (2013.01); *G02B 9/64* (2013.01); *G02B 13/0065* (2013.01);
(Continued)

(58) Field of Classification Search
CPC .... G02B 13/0045; G02B 9/64; G02B 13/009; G02B 13/02; G02B 13/0065; G02B 15/143503
See application file for complete search history.

(56) References Cited

U.S. PATENT DOCUMENTS 5,264,965 A 11/1993 Hirakawa
6,404,562 B1 6/2002 Ota et al.
(Continued)

FOREIGN PATENT DOCUMENTS

CN 106597635 A 4/2017
JP 5-19170 A 1/1993
(Continued)

OTHER PUBLICATIONS

KR-20070122018-A, translation (Year: 2007).*
(Continued)

*Primary Examiner* — Wen Huang
(74) *Attorney, Agent, or Firm* — NSIP Law

(57) ABSTRACT

An optical imaging system includes a first lens group including a first lens and a second lens, a second lens group including a third lens, a fourth lens, and a fifth lens, and a third lens group including a sixth lens and a seventh lens. The first to seventh lenses are arranged in order from an object side, at least one of the first lens group to the third lens group is moved on an optical axis to change a distance between the first lens group to the third lens group, and the following conditional expression is satisfied:

$$0.2 < BFL/(2*IMG\ HT) < 2.0$$

where BFL is a distance on the optical axis from an image-side surface of the seventh lens to an imaging
(Continued)

surface of an image sensor, and IMG HT is half a diagonal length of the imaging surface of the image sensor.

20 Claims, 16 Drawing Sheets

(51) Int. Cl.
  *G02B 13/02* (2006.01)
  *H04N 23/55* (2023.01)
(52) U.S. Cl.
  CPC .......... *G02B 13/009* (2013.01); *G02B 13/02* (2013.01); *H04N 23/55* (2023.01)

(56) References Cited

U.S. PATENT DOCUMENTS

| | | | |
|---|---|---|---|
| 10,139,601 | B2 | 11/2018 | Choi et al. |
| 10,908,387 | B2 | 2/2021 | Lee |
| 2005/0094285 | A1 | 5/2005 | Ohashi |
| 2009/0284642 | A1* | 11/2009 | Ichikawa ....... G02B 15/144511 359/689 |
| 2012/0050892 | A1 | 3/2012 | Lai et al. |
| 2013/0010372 | A1 | 1/2013 | Chou |
| 2016/0266360 | A1* | 9/2016 | Yamasaki ............ G02B 13/04 |
| 2016/0327773 | A1 | 11/2016 | Choi et al. |
| 2017/0108662 | A1 | 4/2017 | Lee |
| 2019/0086638 | A1 | 3/2019 | Lee |
| 2019/0121062 | A1 | 4/2019 | Ohashi |
| 2022/0155571 | A1* | 5/2022 | Xu ................. G02B 15/143503 |

FOREIGN PATENT DOCUMENTS

| | | |
|---|---|---|
| JP | 2003-66331 A | 3/2003 |
| JP | 2018-49201 A | 3/2018 |
| KR | 20070122018 A * | 12/2007 |
| KR | 10-2016-0131824 A | 11/2016 |
| KR | 10-2018-0107187 A | 10/2018 |
| KR | 10-2019-0032905 A | 3/2019 |
| TW | 475066 B | 2/2002 |
| TW | 201209471 A1 | 3/2012 |
| TW | I490538 B | 7/2015 |
| TW | 201925842 A | 7/2019 |
| WO | WO 2013/125603 A1 | 8/2013 |
| WO | WO 2018/154421 A1 | 8/2018 |

OTHER PUBLICATIONS

Taiwanese Office Action issued on Mar. 8, 2023, in counterpart Taiwanese Patent Application No. 111120717 (7 pages in English, 8 pages in Chinese).

Taiwanese Office Action issued on Aug. 3, 2021, in counterpart Taiwanese Patent Application No. 109129750 (10 pages in English and 9 pages in Mandarin).

Chines Office Action issued on Jan. 6, 2022, in counterpart Chinese Patent Application No. 202010893695.6 (9 pages in English and 9 pages in Chinese).

Notice of Reason for Rejection issued on Nov. 19, 2021, in counterpart Korean Patent Application No. 10-2020-0109416 (9 pages in English and 7 pages in Korean).

Chinese Office Action issued on Sep. 14, 2022, in counterpart Chinese Patent Application No. 202010893695.6 (6 pages in English and 7 pages in Chinese).

Office Action issued on Feb. 3, 2023, in related U.S. Appl. No. 17/005,918 (6 pages in English).

U.S. Appl. No. 17/005,918, filed Aug. 28, 2020, Ju Hwa Son et al., Samsung Electro-Mechanics Co., Ltd.

Korean Office Action issued on Nov. 4, 2024, in counterpart Korean Patent Application No. 10-2023-0131946 (8 pages in English, 7 pages in Korean).

* cited by examiner

OPTICAL IMAGING SYSTEM INCLUDING SIX LENSES OF +---++, OR SEVEN LENSES OF --+-++-, +-+--++, -++-+-- or -++-++- REFRACTIVE POWERS

CROSS-REFERENCE TO RELATED APPLICATIONS

This application is a continuation of U.S. patent application Ser. No. 17/005,918 filed on Aug. 28, 2020, now U.S. Pat. No. 11,803,034 issued on Oct. 31, 2023, which claims the benefit under 35 USC 119 (a) of Korean Patent Application No. 10-2019-0107776 filed on Aug. 30, 2019, in the Korean Intellectual Property Office, the entire disclosures of which are incorporated herein by reference for all purposes.

BACKGROUND

1. Field

The present disclosure relates to an optical imaging system.

2. Description of the Background

Camera modules may be used in portable electronic devices such as smartphones. Recently, miniaturization of camera modules mounted in portable electronic devices has been driven due to demand for miniaturization of such portable electronic devices.

However, when a plurality of lenses are disposed in the portable electronic device in a thickness direction, as in the related art, since a thickness of the portable electronic device increases as the number of lenses increases, there may be a problem in miniaturizing such a portable electronic device.

Therefore, when a plurality of lenses are arranged in a portable electronic device in a length or width direction, a thickness of the portable electronic device may be not affected, even as the number of lenses increases. However, in this case, since a diameter of the lenses affects the thickness of the portable electronic device, there may be limitations in reducing the thickness of the portable electronic device by the diameter of the lenses.

Meanwhile, the zoom function can be implemented by changing the focal length by adjusting the distance between a plurality of lenses. However, when the lenses are disposed in the portable electronic device in a thickness direction, as in the related art, there is a problem in that it is difficult to adjust the spacing between the lenses due to the limitation of the thickness.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group including a first lens and a second lens, a second lens group including a third lens, a fourth lens, and a fifth lens, and a third lens group including a sixth lens and a seventh lens, wherein the first to seventh lenses are arranged in order from an object side, wherein at least one of the first lens group to the third lens group is moved on an optical axis to change a distance between the first lens group to the third lens group, and wherein the following conditional expression is satisfied: $0.2 < BFL/(2*IMG\ HT) < 2.0$ where BFL is a distance on the optical axis from an image-side surface of the seventh lens to an imaging surface of an image sensor, and IMG HT is half a diagonal length of the imaging surface of the image sensor.

The first lens group may have negative refractive power, the second lens group may have positive refractive power, and the third lens group may have negative refractive power.

The first lens may have negative refractive power, and the second lens may have positive or negative refractive power.

The third lens may have positive refractive power, the fourth lens may have negative refractive power, and the fifth lens may have positive refractive power.

The sixth lens may have positive or negative refractive power, and the seventh lens has negative refractive power.

The first lens may have positive refractive power, the second lens may have negative refractive power, the third lens may have positive refractive power, the fourth lens may have negative refractive power, the fifth lens may have negative refractive power, the sixth lens may have positive refractive power, and the seventh lens may have positive refractive power.

The optical imaging system may further include a first reflective member disposed in front of the first lens, wherein the first reflective member may have a reflective surface changing a path of light incident on the first reflective member to face the first lens.

A length of one axis, among two axes of the first lens intersecting the optical axis and perpendicular to each other, may be greater than a length of the other axis, wherein the following conditional expression may be satisfied: $0 < L1S1el/PTTL < 0.2$ where L1S1el is a maximum effective radius of an object-side surface of the first lens, and PTTL is a distance on the optical axis from the reflective surface to the imaging surface of the image sensor.

The first lens may include an optical portion and a flange portion extending around at least a portion of the optical portion, wherein the following conditional expression may be satisfied: $0 < AL1/(PTTL)^2 < 0.09$ where AL1 is an area of the optical portion of an object-side surface of the first lens, and PTTL is a distance on the optical axis from the reflective surface to the imaging surface of the image sensor.

The optical imaging system may further include a second reflective member disposed between the seventh lens and the image sensor, wherein the second reflective member may have a reflective surface changing a path of light passing through the first lens to the seventh lens to face the image sensor.

A length of one axis, among two axes of the first lens intersecting an optical axis and perpendicular to each other, may be greater than a length of the other axis, wherein the following conditional expression may be satisfied: $0.7 \leq L1S1es/L1S1el < 0.95$ where L1S1el is a maximum effective radius of an object-side surface of the first lens, and L1S1es is a minimum effective radius of the object-side surface of the first lens.

The first lens may include an optical portion and a flange portion extending around at least a portion of the optical portion, the optical portion may include a first edge, a second edge disposed on an opposite side of the first edge with respect to the optical axis, and a third edge and a fourth edge respectively connecting the first edge and the second edge, the third edge may be disposed on a side opposite to the fourth edge with respect to the optical axis, and a shortest distance between the first edge and the second edge may be greater than a shortest distance between the third edge and the fourth edge.

The following conditional expression may be satisfied: $45°<\alpha<93°$ where $\alpha$ is an angle between a first virtual line connecting the optical axis from a connection point of the first edge and the fourth edge, and a second virtual line connecting the optical axis from a connection point of the second edge and the fourth edge.

The following conditional expression may be satisfied: $1.0<\alpha/(2*FOV)<3.0$ where FOV is an angle of view of the optical imaging system, and a is an angle between a first virtual line connecting the optical axis from a connection point of the first edge and the fourth edge, and a second virtual line connecting the optical axis from a connection point of the second edge and the fourth edge.

A portable electronic device may include three or more camera modules, wherein an optical axis of a first camera module may be formed in a different direction from an optical axis of a second camera module and an optical axis of a third camera module, the first camera module may include the optical imaging system, and the image sensor may be configured to convert light incident through the first to seventh lenses to an electrical signal.

The first camera module may have the narrowest angle of view and the longest focal length, the third camera module may have the widest angle of view and the shortest focal length, and the second camera module may have a wider angle of view than the first camera module and a narrower angle of view than the third camera module.

In another general aspect, an optical imaging system includes a first lens group including a first lens, a second lens, a third lens, and a fourth lens; and a second lens group including a fifth lens and a sixth lens, wherein the first to sixth lenses are arranged in order from an object side, at least one of the first lens group and the second lens group is moved on an optical axis to change a distance between the first lens group and the second lens group, wherein the following conditional expression is satisfied: $0.2<BFL/(2*IMG\ HT)<2.0$ where BFL is a distance on the optical axis from an image-side surface of the sixth lens to an imaging surface of an image sensor, and IMG HT is half a diagonal length of the imaging surface of the image sensor.

The first lens group may have positive refractive power, and the second lens group may have positive refractive power.

The first lens may have positive refractive power, the second lens may have negative refractive power, the third lens may have negative refractive power, the fourth lens may have negative refractive power, the fifth lens may have positive refractive power, and the sixth lens may have positive refractive power.

The optical imaging system may further include a first reflective member disposed in front of the first lens, the first reflective member may have a reflective surface changing a path of light incident on the first reflective member to face the first lens, a length of one axis, among two axes of the first lens intersecting an optical axis and perpendicular to each other, may be greater than a length of the other axis, the following conditional expression may be satisfied: $0<L1S1el/PTTL<0.2$ where L1S1el is a maximum effective radius of an object-side surface of the first lens, and PTTL is a distance on the optical axis from the reflective surface to the imaging surface of the image sensor.

The first lens may include an optical portion and a flange portion extending around at least a portion of the optical portion, wherein the following conditional expression may be satisfied: $0<AL1/(PTTL)^2<0.09$ where AL1 is an area of the optical portion of an object-side surface of the first lens.

The first lens may include an optical portion and a flange portion extending around at least a portion of the optical portion, the optical portion may include a first edge, a second edge disposed on an opposite side of the first edge with respect to the optical axis, and a third edge and a fourth edge respectively connecting the first edge and the second edge, the third edge may be disposed on a side opposite to the fourth edge with respect to the optical axis, a shortest distance between the first edge and the second edge may be greater than a shortest distance between the third edge and the fourth edge, and the following conditional expression may be satisfied: $45°<\alpha<93°$ where $\alpha$ is an angle between a first virtual line connecting the optical axis from a connection point of the first edge and the fourth edge, and a second virtual line connecting the optical axis from a connection point of the second edge and the fourth edge.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
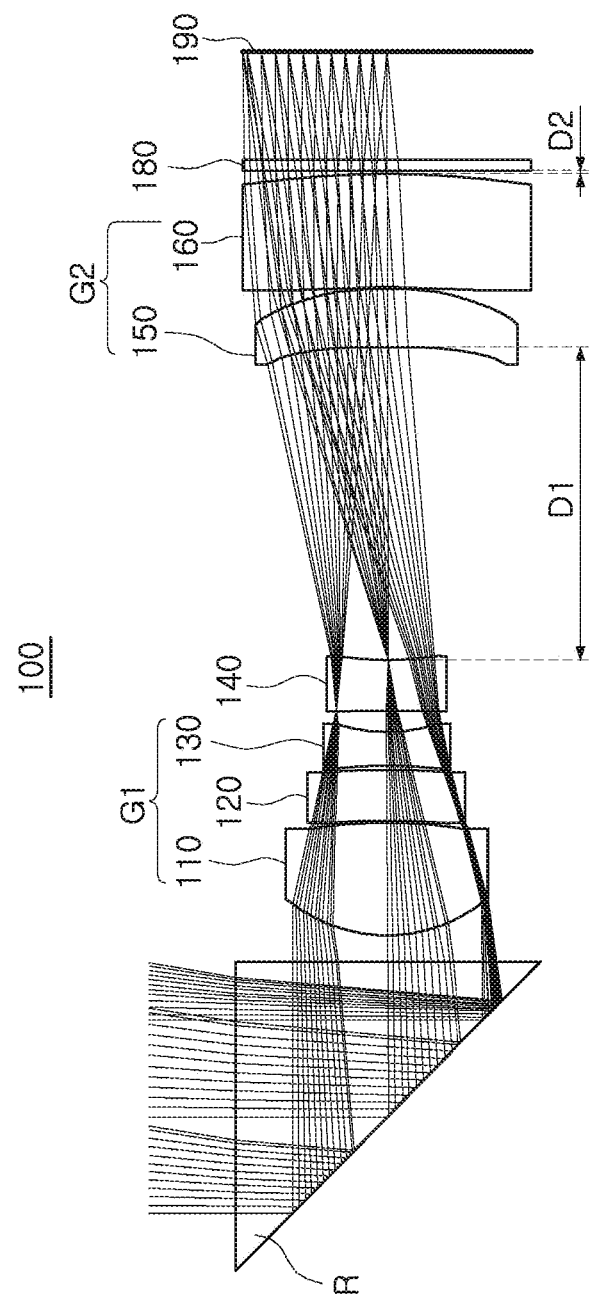
FIG. 1 is a configuration diagram of an optical imaging system according to a first embodiment of the present disclosure.

Hereinafter, embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Due to manufacturing techniques and/or tolerances, variations of the shapes shown in the drawings may occur. Thus, the examples described herein are not limited to the specific shapes shown in the drawings, but include changes in shape that occur during manufacturing.

In the following lens configuration diagrams, the thickness, size, and shape of lenses may be illustrated in a somewhat exaggerated manner for explanatory purposes, and in detail, the shape of a spherical or aspheric surface presented in the lens configuration diagram is illustrated by way of example only and is not limited thereto.

Herein, it is noted that use of the term "may" with respect to an example, for example, as to what an example may include or implement, means that at least one example exists in which such a feature is included or implemented while all examples are not limited thereto.

An aspect of the present disclosure is to provide an optical imaging system that may be mounted in a portable electronic device having a relatively thin profile, and the optical imaging system may have a relatively long focal length.

An optical imaging system according to an embodiment of the present disclosure may include a plurality of lenses disposed along an optical axis. The plurality of lenses may be spaced from each other by a predetermined distance along the optical axis.

As an example, the optical imaging system may include six or seven lenses.

In an embodiment including six lenses, a first lens refers to a lens closest to an object side (or a reflective member), and a sixth lens refers to a lens closest to an image sensor.

In an embodiment including seven lenses, a first lens refers to a lens closest to an object side (or a reflective member), and a seventh lens refers to a lens closest to an image sensor.

In addition, in each lens, a first surface (or an object-side surface) refers to a surface closest to the object, and a second surface (or an image-side surface) refers to a surface closest to an imaging plane. In the present specification, the numerical values with respect to a radius of curvature of a lens, a thickness, and the like of the lens are all in mm, and the unit of an angle is degrees.

In addition, in the description of the shape of each lens, a convex shape of one surface indicates that a paraxial region of the surface is convex, and a concave shape of one surface indicates that a paraxial region of the surface is concave. Therefore, even in the case in which one surface of the lens is described as having a convex shape, an edge portion of the lens may be concave. Similarly, even in a case in which one surface of the lens is described as having a concave shape, the edge portion of the lens may be convex.

The paraxial region refers to a relatively narrow region near an optical axis including the optical axis.

An optical imaging system according to an embodiment of the present disclosure may include six or seven lenses.

For example, in an embodiment including six lenses, the optical imaging system may include a first lens, a second lens, a third lens, a fourth lens, a fifth lens, and a sixth lens, arranged in that order from the object side.

In an embodiment including seven lenses, the optical imaging system may include a first lens, a second lens, a third lens, a fourth lens, a fifth lens, a sixth lens, and a seventh lens, arranged in that order from the object side.

However, the optical imaging system according to the present disclosure may be not only composed of 6 or 7 lenses, and may further include other components.

For example, the optical imaging system may further include a reflective member having a reflective surface changing an optical path. For example, the reflective member may be a mirror or a prism.

The reflective member may be disposed closer to the object side than the plurality of lenses. For example, the reflective member may be disposed closer to the object side than the first lens. Therefore, a lens disposed closest to the object side may be a lens disposed closest to the reflective member.

In addition, the optical imaging system may further include an image sensor for converting an image of an incident subject into an electrical signal.

In addition, the optical imaging system may further include an infrared cutoff filter (hereinafter, referred to as a filter) for blocking infrared rays. The filter is disposed between the image sensor and a lens (for example, a sixth or seventh lens) disposed closest to the image sensor.

Also, two reflective members may be provided. In this case, one reflective member may be disposed closer to the object side than the first lens, and the other reflective member may be disposed between the lens disposed closest to the image sensor and the filter.

All lenses constituting the optical imaging system according to an embodiment of the present disclosure may be formed of a plastic material.

Figure 13:
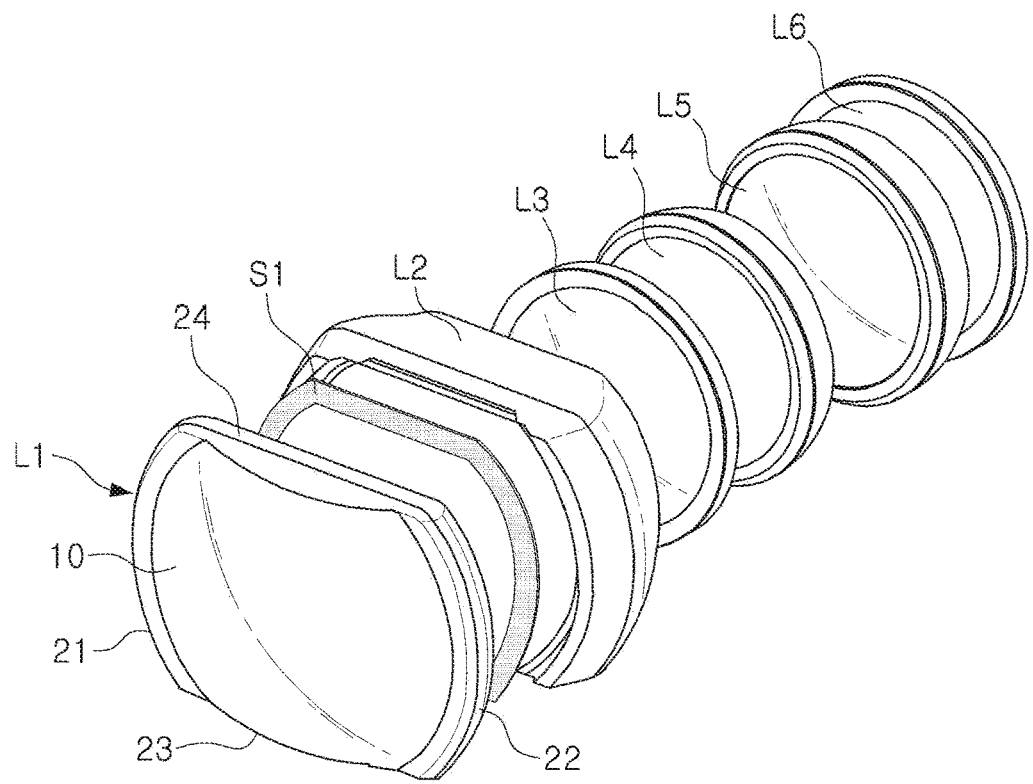
FIG. 13 is a schematic perspective view of an optical imaging system according to an embodiment of the present disclosure.
Figure 14:
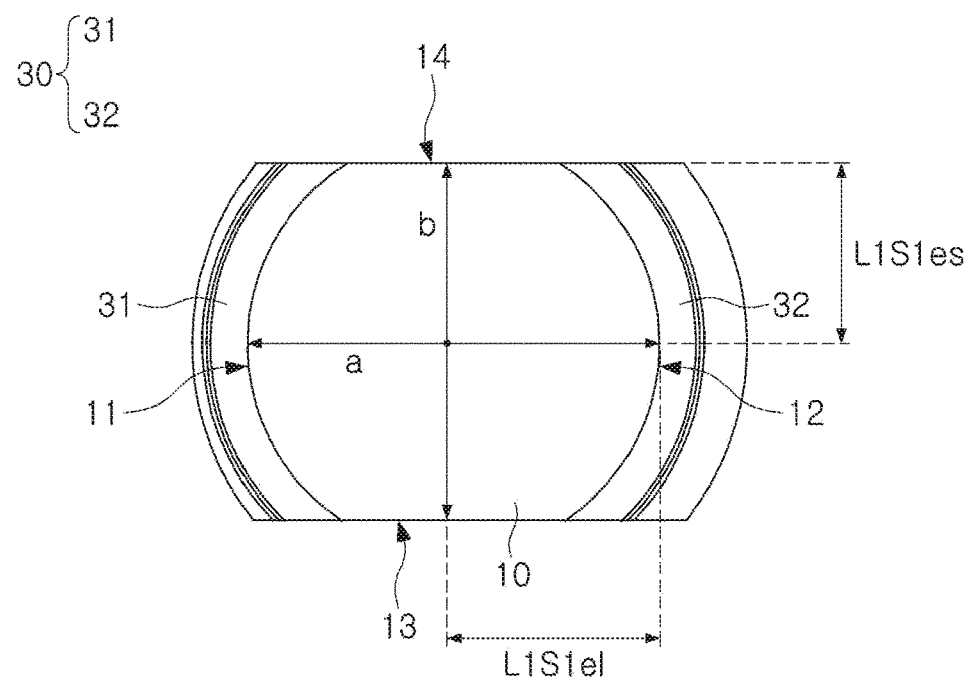
FIGS. 14 and 15 are plan views of a first lens of an optical imaging system according to an embodiment of the present disclosure.

Referring to FIGS. 13 and 14, at least some lenses of an optical imaging system may have a non-circular planar shape. For example, at least one of a first lens L1 and a second lens L2 may be formed to have a non-circular shape, and the remaining lenses may be formed to have a circular shape. Alternatively, all lenses of the optical imaging system may be formed to have a non-circular shape.

The term 'non-circular shape' refers to a lens shape that is not circular in a region other than a gate of a plastic injection lens.

The non-circular lens may have four side surfaces, and each of the two side surfaces may be formed to face each other. In addition, the side surfaces facing each other may be provided to have a corresponding shape.

For example, when viewed in an optical axis direction, a first side surface 21 and a second side surface 22 of the first lens L1 may have an arc shape, and a third side surface 23 and a fourth side surface 24 may have a substantially linear shape (see FIG. 13). A gate, a movement path of a resin material, may be formed on either the first side surface 21 or the second side surface 22.

The third side surface 23 and the fourth side surface 24 may connect the first side surface 21 and the second side surface 22, respectively. In addition, the third side surface 23 and the fourth side surface 24 may be symmetrical about the optical axis, and may be formed parallel to each other.

The term 'circular shape' refers to a shape in which a gate of the plastic injection lens is removed (i.e., a shape in which a portion of the circle is cut).

All lenses of the optical imaging system may include an optical portion 10 and a flange portion 30. Hereinafter, one or more examples of a non-circular lens will be described in detail with reference to FIGS. 13 to 15.

The first lens L1 and the second lens L2 may have a non-circular shape, but are not limited thereto, and all the lenses may have a non-circular shape.

Hereinafter, for convenience of description, only the first lens L1 will be described.

The optical portion 10 may be a portion in which optical performance of the first lens L1 is exerted. For example, light reflected from the subject may be refracted while passing through the optical portion 10.

The optical portion 10 may have refractive power and may have an aspherical shape.

In addition, the optical portion 10 may include an object-side surface (a surface facing the object side) and an image-side surface (a surface facing the imaging plane) (the object-side surface is illustrated in FIG. 14).

The flange portion 30 may be a portion fixing the first lens L1 to another configuration, for example, a lens barrel or the second lens L2.

The flange portion 30 may extend around at least a portion of the optical portion 10, and may be integrally formed with the optical portion 10.

The optical portion 10 and the flange portion 30 may be formed to have a non-circular shape. For example, the optical portion 10 and the flange portion 30 may be non-circular, when viewed in the optical axis direction (see FIGS. 14 and 15). Unlike this, the optical portion 10 may be formed to have a circular shape, and the flange portion 30 may be formed to have a non-circular shape.

The optical portion 10 may include a first edge 11, a second edge 12, a third edge 13, and a fourth edge 14, and the first edge 11 and the second edge 12 may be located to face each other, and the third edge 13 and the fourth edge 14 may be located to face each other.

The third edge 13 and the fourth edge 14 may connect the first edge 11 and the second edge 12, respectively.

When viewed in the optical axis direction, the first edge 11 and the second edge 12 may have an arc shape, and the third edge 13 and the fourth edge 14 may have a generally linear shape. The third edge 13 and the fourth edge 14 may be formed symmetrical about the optical axis, and may be formed parallel to each other.

The optical portion 10 may have a major axis (a) and a minor axis (b). For example, when viewed in the optical axis direction, a line segment connecting the third edge 13 and the fourth edge 14 at the shortest distance while passing through the optical axis may be the minor axis (b), and a line segment connecting the first edge 11 and the second edge 12 while passing through the optical axis and perpendicular to the minor axis (b) may be the major axis (a).

In this case, half of the major axis (a) may be the maximum effective radius, and half of the minor axis (b) may be the minimum effective radius.

The flange portion 30 may include a first flange portion 31 and a second flange portion 32. The first flange portion 31 may extend from the first edge 11 of the optical portion 10, and the second flange portion 32 may extend from the second edge 12 of the optical portion 10.

The first edge 11 of the optical portion 10 may refer to a portion adjacent to the first flange portion 31, and the second edge 12 of the optical portion 10 may refer to a portion adjacent to the second flange portion 32.

The third edge 13 of the optical portion 10 may refer to one side surface of the optical portion 10 on which the flange portion 30 is not formed, and the fourth edge 14 of the optical portion 10 may refer to the other side surface of the optical portion 10 on which the flange portion 30 is not formed.

The first lens L1 may be formed of a plastic material and may be injection-molded through a mold. In this case, the third edge 13 and the fourth edge 14 of the first lens L1 according to the present embodiment may be not formed by cutting a portion of the lens after injection-molding, but are formed to have such a shape in the injection-molding.

When a portion of the lens is removed after injection-molding, the lens may be deformed by force applied to the lens. In a case in which the lens is deformed, optical performance of the lens is changed, which may be problematic.

However, in the first lens L1 according to the present embodiment, since the first lens L1 is formed to have a non-circular shape when the first lens L1 is injected, a size of the first lens L1 may be reduced, while securing performance of the first lens L1.

In this embodiment, an effective radius of the non-circular lens may be formed to be larger than an effective radius of other lenses.

The effective radius refers to a radius of one surface (an object-side surface and an image-side surface) of each lens through which light actually passes. For example, the effective radius refers to a radius of the optical portion of each lens.

Since the first lens L1 is non-circular, an effective radius of the first lens L1 may have a maximum effective radius, corresponding to half of a virtual straight line connecting the first edge 11 and the second edge 12 while passing through an optical axis, and a minimum effective radius, corresponding to half of a virtual straight line connecting the third edge 13 and the fourth edge 14 while passing through the optical axis.

Figure 15:
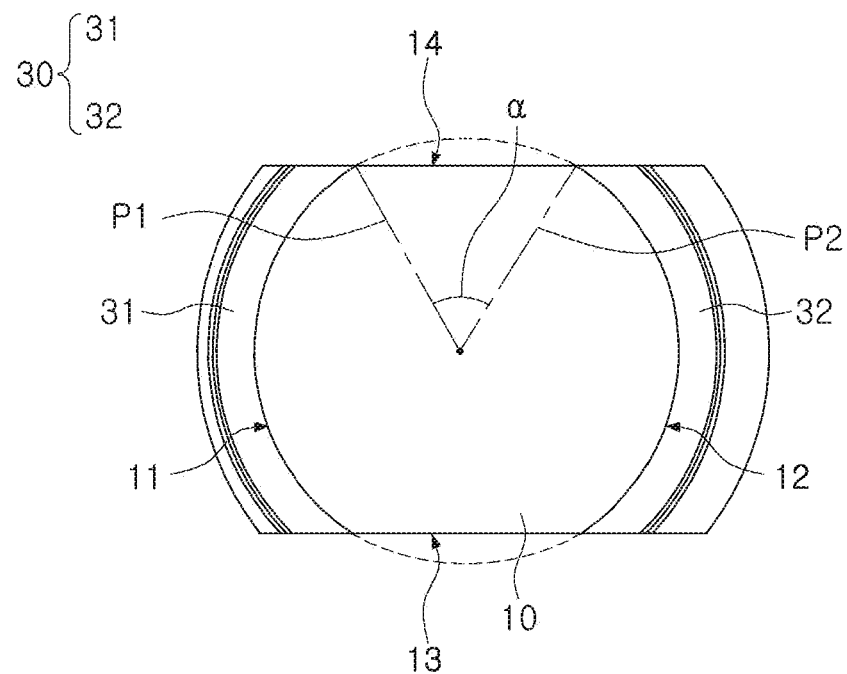

Referring to FIG. 15, a first virtual line connecting the optical axis from a connection point between the first edge 11 and the fourth edge 14 of the non-circular lens may be defined as P1, a second virtual line connecting the optical axis from a connection point between the second edge 12 and the fourth edge 14 of the non-circular lens may be defined as P2, and an angle between the two virtual lines may be defined as a. P1 may also be defined as a first virtual line connecting the optical axis from a connection point between the first edge 11 and the third edge 13 of the non-circular lens, P2 may be defined as a second virtual line connecting the optical axis from a connection point between the second edge 12 and the third edge 13 of the non-circular lens such that the angle between the two virtual lines may also define a.

Each of the plurality of lenses may have at least one aspheric surface.

For example, at least one of the first surface and the second surface of each of the first lens to the sixth or seventh lens may be an aspheric surface. In this case, the aspheric surfaces of the first lens to the sixth or seventh lens are represented by the following equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} \qquad \text{[Equation 1]}$$

In Equation 1, c is curvature of the lens (inverse of a curvature radius), K is a conic constant, and Y is a distance from an arbitrary point on an aspheric surface of the lens to an optical axis. In addition, constants A to J are aspheric coefficients. Z represents a distance (SAG) from an arbitrary point on the aspheric surface of the lens to an apex of the aspheric surface.

An optical imaging system according to an embodiment of the present disclosure may satisfy at least one of the following conditional expressions:

| | |
|---|---|
| $0.7 \leq L1S1es/L1S1el < 0.95$ | [Conditional Expression 1] |
| $0.7 \leq L1S2Es/L1S2el < 0.95$ | [Conditional Expression 2] |
| $0.7 \leq L2S1es/L2S1el < 0.95$ | [Conditional Expression 3] |
| $0.7 \leq L2S2es/L2S2el < 0.95$ | [Conditional Expression 4] |
| $0.4 \text{ mm} < DpL1 < 0.9 \text{ mm}$ | [Conditional Expression 5] |
| $17.0 \text{ mm} < PTTL < 22.0 \text{ mm}$ | [Conditional Expression 6] |
| $0.7 \leq s1es/s1el < 0.95$ | [Conditional Expression 7] |
| $0.5 < L1S1el/\text{IMG } HT < 1.0$ | [Conditional Expression 8] |
| $0 < L1S1el/PTTL < 0.2$ | [Conditional Expression 9] |
| $0 < L1S1es/PTTL < 0.1$ | [Conditional Expression 10] |
| $0 < L2S1el/PTTL < 0.12$ | [Conditional Expression 11] |
| $0 < L2S1es/PTTL < 0.1$ | [Conditional Expression 12] |
| $0 < AL1/(PTTL)^2 < 0.05$ | [Conditional Expression 13] |
| $45° < \alpha < 93°$ | [Conditional Expression 14] |
| $1.0 < \alpha/(2*FOV) < 3.0$ | [Conditional Expression 15] |
| $0.2 < BFL/(2*\text{IMG } HT) < 2.0$ | [Conditional Expression 16] |
| $2.7 \leq Fno < 7$ | [Conditional Expression 17] |
| $10° < FOV < 35°$ | [Conditional Expression 18] |

L1S1el is the maximum effective radius of the object-side surface of the first lens, L1S1es is the minimum effective radius of the object-side surface of the first lens, L1S2el is the maximum effective radius of the image-side surface of the first lens, and L1S2es is the minimum effective radius of the image-side surface of the first lens.

L2S1el is the maximum effective radius of the object-side surface of the second lens, L2S1es is the minimum effective radius of the object-side surface of the second lens, L2S2el is the maximum effective radius of the image-side surface of the second lens, and L2S2es is the minimum effective radius of the image-side surface of the second lens.

DpL1 is a distance between an exit surface of a prism and the object side surface of the first lens along the optical axis, TTL is a distance from the object side surface of the first lens to the imaging surface of the image sensor along the optical axis, and PTTL is a distance from the reflective surface of the prism to the imaging surface of the image sensor along the optical axis.

s1el is the maximum radius of an opening of a spacer disposed between the first lens and the second lens, and s1es is the minimum radius of the opening of the spacer disposed between the first lens and the second lens.

IMG HT is half a diagonal length of the imaging surface of the image sensor.

AL1 is an area of the optical portion of the object-side surface of the first lens. In this case, the area means an area of a plane viewed when the first lens is viewed in the optical axis direction (see FIG. 14).

α is an angle between a first virtual line P1 connecting the optical axis (a Z-axis) from a connection point of the first side surface 21 and the fourth side surface 24 of the first lens, and a second virtual line P2 connecting the optical axis (the Z-axis) from a connection point of the second side surface 22 and the fourth side surface 24 of the first lens.

FOV is an angle of view of the optical imaging system, and BFL is a distance from the image-side surface of the lens disposed closest to the image sensor to the image-side surface of the image sensor along the optical axis.

Fno is the F-number of the optical imaging system.

The optical imaging system according to an embodiment of the present disclosure may include a plurality of lens groups. As an example, the optical imaging system may include a first lens group and a second lens group. The first lens group and the second lens group may include a plurality of lenses, respectively. The first lens group and the second lens group may be sequentially arranged from the object side toward the image side.

The first lens group may include a first lens, a second lens, a third lens, and a fourth lens. The first lens may have positive refractive power, and first and second surfaces may be convex. The second lens may have negative refractive power, a first surface may be concave, and a second surface may be convex. The third lens may have negative refractive power, and first and second surfaces may be concave. The fourth lens may have negative refractive power, a first surface may be convex, and a second surface may be concave.

The first lens group may have positive refractive power as a whole.

The second lens group may include a fifth lens and a sixth lens. The fifth lens may have positive refractive power, a first surface may be concave, and a second surface may be convex. The sixth lens may have positive refractive power, a first surface may be concave, and a second surface may be convex.

The second lens group may have positive refractive power as a whole.

At least one of the first lens group and the second lens group may be moved to change the overall focal length of the optical imaging system. For example, the optical imaging system has an optical zoom function.

As another example, the optical imaging system may include a first lens group, a second lens group, and a third lens group. The first to third lens groups may include a plurality of lenses, respectively. The first lens group to the third lens group may be sequentially arranged from the object side toward the image side.

The first lens group may include a first lens and a second lens.

The first lens may have positive or negative refractive power. The first lens may have a convex shape on a first surface and a concave shape on a second surface. Alternatively, the first lens may have a shape in which the first surface and the second surface are convex.

The second lens may have positive or negative refractive power. The second lens may have a convex shape on a first surface and a concave shape on a second surface. Alternatively, the second lens may have a shape in which the first surface and the second surface are concave.

The first lens group may have positive or negative refractive power as a whole.

The second lens group may include a third lens, a fourth lens, and a fifth lens.

The third lens may have positive refractive power. The third lens may have a shape in which first and second surfaces are convex. Alternatively, the third lens may have a concave shape on a first surface and a convex shape on a second surface.

The fourth lens may have negative refractive power. The fourth lens may have a concave shape in which first and second surfaces are concave. Alternatively, the fourth lens may have a concave shape on a first surface and a convex shape on a second surface.

The fifth lens may have positive or negative refractive power. In the fifth lens, the first surface may be convex, and the second surface may be concave. Alternatively, the fifth lens may have a shape in which the first and second surfaces are convex.

The second lens group may have positive or negative refractive power as a whole.

The third lens group may include a sixth lens and a seventh lens.

The sixth lens may have positive or negative refractive power. In the sixth lens, a first surface may be concave and a second surface may be convex.

The seventh lens may have positive or negative refractive power. In the seventh lens, a first surface may be convex, and a second surface may be concave. Alternatively, the seventh lens may have a concave shape in which the first and second surfaces are concave. Alternatively, the seventh lens may have a concave shape on the first surface and a convex shape on the second surface.

The third lens group may have positive or negative refractive power as a whole.

At least one of the first to third lens groups may be moved to change the overall focal length of the optical imaging system. For example, the optical imaging system may have an optical zoom function.

The optical imaging system according to an embodiment of the present disclosure has a feature of a telephoto lens having a relatively narrow angle of view and a relatively long focal length.

An optical imaging system according to a first embodiment of the present disclosure will be described with reference to FIGS. 1 and 2.

The optical imaging system 100 according to the first embodiment of the present disclosure may include a first lens group G1 and a second lens group G2.

The first lens group G1 may include a first lens 110, a second lens 120, a third lens 130, and a fourth lens 140, and the second lens group G2 may include a fifth lens 150 and a sixth lens 160. In addition, the optical imaging system may further include a filter 180 and an image sensor 190.

In addition, a reflective member R disposed closer to an object side than the first lens 110 and having a reflective surface changing an optical path may be further included. In the first embodiment of the present disclosure, the reflective member R may be a prism, but may also be provided as a mirror.

Light incident on the reflective member R may be bent by the reflective member R to pass through the first lens group G1 and the second lens group G2.

At least one of the first lens group G1 and the second lens group G2 may be moved to change the overall focal length of the optical imaging system. As an example, the second lens group G2 in the optical axis direction may be moved to change a distance between the first lens group G1 and the second lens group G2, and a distance between the second lens group G2 and the image sensor 190.

Lens characteristics of each lens (radius of curvature, a thickness of a lens or a distance between lenses, a refractive index, Abbe number, a focal length) are illustrated in the following Table 1.

In the optical imaging system at the second position, the total focal length f is 13 mm, Fno is 3.8, and FOV is 22.1462°.

In the first embodiment of the present disclosure, the first lens group G1 and the second lens group G2 have positive refractive power as a whole. A focal length of the first lens group G1 is 20.01 mm, and a focal length of the second lens group G2 is 14.672 mm.

The first lens 110 has positive refractive power, and first and second surfaces of the first lens 110 are convex.

The second lens 120 has negative refractive power, a first surface of the second lens 120 is concave, and a second surface of the second lens 120 is convex.

The third lens 130 has negative refractive power, and first and second surfaces of the third lens 130 are concave.

The fourth lens 140 has negative refractive power, a first surface of the fourth lens 140 is convex, and a second surface of the fourth lens 140 is concave.

TABLE 1

| Surface No. | Remarks | Curvature Radius | Thickness or Distance | Refractive Index | Abbe No. | Maximum Effective Radius | Focal Length |
|---|---|---|---|---|---|---|---|
| S1 | Prism | Infinity | 2.7 | 1.723 | 29.500 | 2.626 | |
| S2 | | Infinity | 2.7 | 1.723 | 29.500 | | |
| S3 | | Infinity | 0.5 | | | 2.019 | |
| S4 | 1st Lens | 2.92533783 | 1.942 | 1.536 | 55.656 | 1.800 | 4.111 |
| S5 | | −6.8614712 | 0.030 | | | 1.442 | |
| S6 | 2nd Lens | −13.705915 | 0.879 | 1.667 | 20.353 | 1.402 | −35.818 |
| S7 | | −32.981003 | 0.107 | | | 1.145 | |
| S8 | 3rd Lens | −4.1022254 | 0.580 | 1.546 | 56.114 | 1.128 | −4.372 |
| S9 | | 5.99361345 | 0.350 | | | 0.957 | |
| S10 | 4th Lens | 13.5210434 | 0.906 | 1.667 | 20.353 | 0.911 | −14.183 |
| S11 | | 5.416423 | D1 | | | 1.054 | |
| S12 | 5th Lens | −24.265437 | 1.000 | 1.536 | 55.656 | 2.121 | 14.341 |
| S13 | | −5.9218901 | 0.030 | | | 2.335 | |
| S14 | 6th Lens | −13.299145 | 2.000 | 1.667 | 20.353 | 2.401 | 391.507 |
| S15 | | −13.416001 | D2 | | | 2.544 | |
| S16 | Filter | Infinity | 0.210 | 1.518 | 64.197 | 2.549 | |
| S17 | | Infinity | 1.885 | | | 2.553 | |
| S18 | Imaging Surface | Infinity | | | | 2.602 | |

TABLE 2

| | 1st Position | 2nd Position |
|---|---|---|
| D1 | 5.473 | 0.159 |
| D2 | 0.036 | 2.962 |

In the optical imaging system according to the first embodiment of the present disclosure, IMG HT is 2.6 mm, α is 91.146°, and AL1 is 8.26 mm².

In the optical imaging system at the first position, the total focal length f is 17 mm, Fno is 5.0, and FOV is 17.3494°.

The fifth lens 150 has positive refractive power, a first surface of the fifth lens 150 is concave, and a second surface of the fifth lens 150 is convex.

The sixth lens 160 has positive refractive power, a first surface of the sixth lens 160 is concave, and a second surface of the sixth lens 160 is convex.

Respective surfaces of the first lens 110 to the sixth lens 160 have aspheric surface coefficients as illustrated in Table 3. For example, both the object-side surface and the image-side surface of the first lens 110 to the sixth lens 160 are aspheric surfaces.

TABLE 3

| | K | A | B | C | D | E | F | G | H | J |
|---|---|---|---|---|---|---|---|---|---|---|
| S4 | −0.01913 | 0.00011 | 0.000636 | −0.00096 | 0.000891 | −0.00051 | 0.000183 | −4E−05 | 4.78E−06 | −2.4E−07 |
| S5 | −1.95147 | 0.0151 | 0.000535 | −0.00104 | 0.000299 | −4.6E−05 | 4.1E−06 | −2.1E−07 | 6.05E−09 | −7.2E−11 |
| S6 | 7.893201 | 0.00362 | 0.002846 | 0.000497 | −0.00174 | 0.001274 | −0.00049 | 0.000107 | −1.3E−05 | 6.38E−07 |
| S7 | 59 | −0.00187 | 0.006543 | 0.009797 | −0.02221 | 0.020899 | −0.01107 | 0.003471 | −0.00061 | 4.55E−05 |
| S8 | −26.9747 | 0.018637 | 0.016369 | −0.02068 | 0.010352 | −0.00221 | 1.51E−05 | 6.98E−05 | −1E−05 | 4.7E−07 |
| S9 | 16.32205 | 0.032358 | −0.00442 | −0.00688 | 0.003705 | −0.00083 | 0.000102 | −7.1E−06 | 2.63E−07 | −4.1E−09 |
| S10 | −59 | −0.05083 | 0.013229 | −0.00107 | −0.00803 | 0.008384 | −0.00405 | 0.001018 | −0.00013 | 6.37E−06 |
| S11 | −50.3659 | 0.005102 | −0.02546 | 0.039817 | −0.05526 | 0.058367 | −0.0425 | 0.019868 | −0.00538 | 0.000647 |
| S12 | 59 | −0.0081 | −0.00115 | 0.000252 | −1.8E−05 | 7.37E−07 | −1.8E−08 | 2.64E−10 | −2.2E−12 | 7.85E−15 |

TABLE 3-continued

| | K | A | B | C | D | E | F | G | H | J |
|---|---|---|---|---|---|---|---|---|---|---|
| S13 | −38.5124 | −0.01302 | 0.000324 | −2.9E−06 | 7.71E−09 | 4.34E−11 | −4E−13 | 1.42E−15 | −1.4E−17 | 4.29E−19 |
| S14 | −5.32344 | 0.01534 | −0.00741 | 0.00394 | −0.00166 | 0.000509 | −0.00011 | 1.43E−05 | −1.1E−06 | 3.59E−08 |
| S15 | −21.6354 | 0.000966 | 0.000214 | 3.88E−05 | −0.00011 | 6.72E−05 | −2E−05 | 3.01E−06 | −2.4E−07 | 7.55E−09 |

Figure 2:
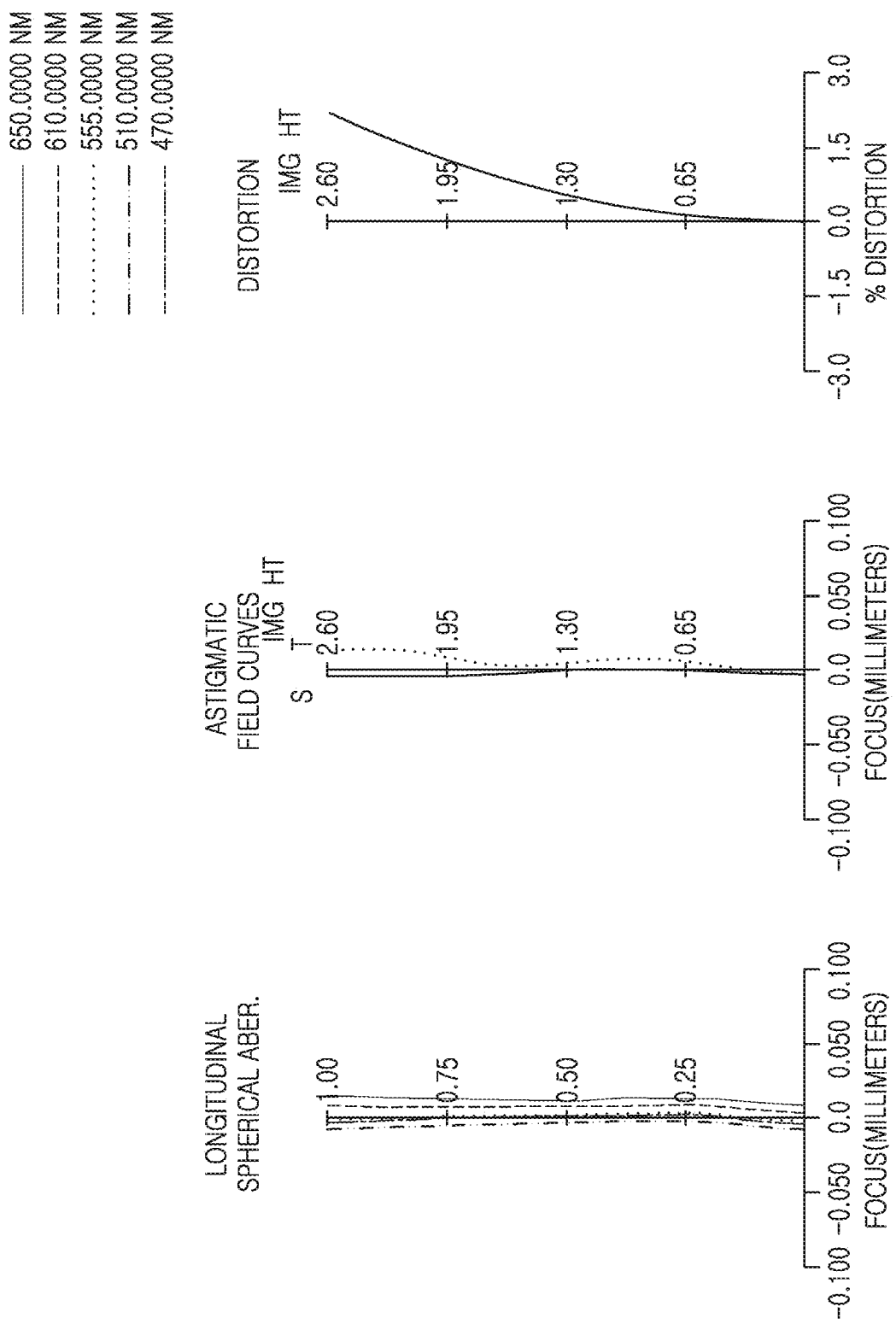
FIG. 2 is a curve illustrating aberration characteristics of the optical imaging system illustrated in FIG. 1.

In addition, the optical system configured as described above may have aberration characteristics as illustrated in FIG. 2.

Figure 3:
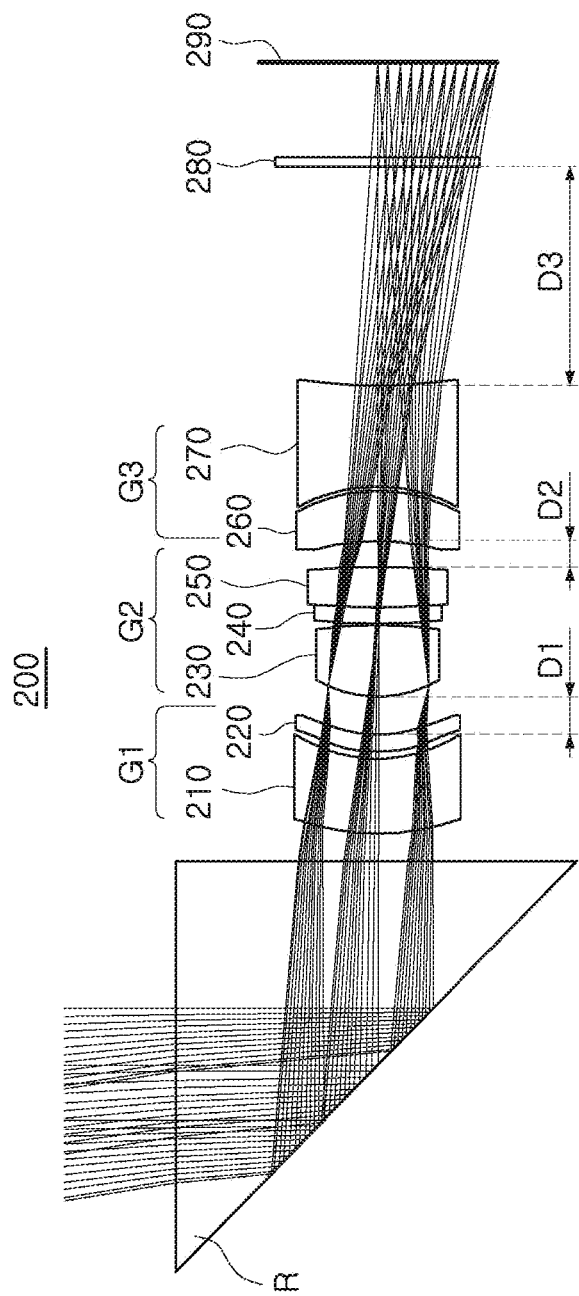
FIG. 3 is a configuration diagram of an optical imaging system according to a second embodiment of the present disclosure.

An optical imaging system according to a second embodiment of the present disclosure will be described with reference to FIGS. 3 and 4.

The optical imaging system 200 according to the second embodiment of the present disclosure may include a first lens group G1, a second lens group G2, and a third lens group G3.

The first lens group G1 may include a first lens 210 and a second lens 220, the second lens group G2 may include a third lens 230, a fourth lens 240, and a fifth lens 250, and the third lens group G3 may include a sixth lens 260 and a seventh lens 270. In addition, the optical imaging system may further include a filter 280 and an image sensor 290.

In addition, a reflective member R disposed closer to an object side than the first lens 210 and having a reflective surface changing an optical path may be further included. In the second embodiment of the present disclosure, the reflective member R may be a prism, but may also be provided as a mirror.

Light incident on the reflective member R may be bent by the reflective member R to pass through the first lens group G1 to the third lens group G3.

At least one of the first lens group G1 to the third lens group G3 may be moved to change the overall focal length of the optical imaging system. For example, the second lens group G2 and the third lens group G3 in the optical axis direction may be moved, respectively, to change a distance between the first lens group G and the second lens group G2, a distance between the second lens group G2 and the third lens group G3, and a distance between the third lens group G3 and the image sensor 290.

Lens characteristics of each lens (radius of curvature, a thickness of a lens or a distance between lenses, a refractive index, Abbe number, a focal length) are illustrated in the following Table 4.

TABLE 4

| Surface No. | Remarks | Curvature Radius | Thickness or Distance | Refractive Index | Abbe No. | Maximum Effective Radius | Focal Length |
|---|---|---|---|---|---|---|---|
| S1 | Prism | Infinity | 4 | 1.723 | 29.500 | 3.999 | |
| S2 | | Infinity | 4 | 1.723 | 29.500 | | |
| S3 | | Infinity | 0.5 | | | 2.827 | |
| S4 | 1st Lens | 4.80541007 | 1.482 | 1.546 | 56.114 | 1.500 | −34.606 |
| S5 | | 3.41430307 | 0.119 | | | 1.658 | |
| S6 | 2nd Lens | 2.63232291 | 0.329 | 1.667 | 20.353 | 1.640 | −31.374 |
| S7 | | 2.22164728 | D1 | | | 1.562 | |
| S8 | 3rd Lens | 2.46243767 | 1.392 | 1.546 | 56.114 | 1.000 | 3.993 |
| S9 | | −15.355592 | 0.030 | | | 1.218 | |
| S10 | 4th Lens | −24.032978 | 0.300 | 1.667 | 20.353 | 1.241 | −18.300 |
| S11 | | 25.0574805 | 0.030 | | | 1.247 | |
| S12 | 5th Lens | 25.4902388 | 0.748 | 1.546 | 56.114 | 1.200 | 28.347 |
| S13 | | −39.084927 | D2 | | | 1.392 | |
| S14 | 6th Lens | −3.7567904 | 1.000 | 1.546 | 56.114 | 1.319 | 13.090 |
| S15 | | −2.6948813 | 0.087 | | | 1.600 | |
| S16 | 7th Lens | −3.5251943 | 2.000 | 1.546 | 56.114 | 1.603 | −4.235 |
| S17 | | 8.09180858 | D3 | | | 1.604 | |
| S18 | Filter | Infinity | 0.210 | 1.518 | 64.197 | 2.002 | |
| S19 | | Infinity | 1.828 | | | 2.027 | |
| S20 | Imaging Surface | Infinity | | | | 2.350 | |

TABLE 5

| | 1st Position | 2nd Position |
|---|---|---|
| D1 | 0.752 | 3.998 |
| D2 | 0.500 | 1.253 |
| D3 | 4.193 | 0.262 |

In the optical imaging system according to the second embodiment of the present disclosure, IMG HT is 2.35 mm, a is 91.146°, and AL1 is 5.74 mm².

In the optical imaging system at the first position, the total focal length f is 15 mm, Fno is 6.8, and FOV is 17.8844°.

In the optical imaging system at the second position, the total focal length f is 8 mm, Fno is 4.4, and FOV is 32.2886°.

In the second embodiment of the present disclosure, the first lens group G1 has negative refractive power as a whole, the second lens group G2 has positive refractive power as a whole, and the third lens group G3 has negative refractive power as a whole. A focal length of the first lens group G1 is −16.914 mm, a focal length of the second lens group G2 is 4.288 mm, and a focal length of the third lens group G3 is −5.758 mm.

The first lens 210 has negative refractive power, a first surface of the first lens 210 is convex, and a second surface of the first lens 210 is concave.

The second lens 220 has negative refractive power, a first surface of the second lens 220 is convex, and a second surface of the second lens 220 is concave.

The third lens 230 has positive refractive power, and first and second surfaces of the third lens 230 are convex.

The fourth lens 240 has negative refractive power, and first and second surfaces of the fourth lens 240 are concave.

The fifth lens 250 has positive refractive power, and first and second surfaces of the fifth lens 250 are convex.

The sixth lens 260 has positive refractive power, a first surface of the sixth lens 260 is concave, and a second surface of the sixth lens 260 is convex.

The seventh lens 270 has negative refractive power, and first and second surfaces of the seventh lens 270 are concave.

Respective surfaces of the first lens 210 to the seventh lens 270 have aspheric surface coefficients as illustrated in Table 6. For example, both the object-side surface and the image-side surface of the first lens 210 to the seventh lens 270 are aspheric surfaces.

TABLE 6

|  | K | A | B | C | D | E | F | G |
|---|---|---|---|---|---|---|---|---|
| S4 | −13.1642 | 0.015309 | −0.0054 | 0.002052 | −0.00067 | 0.000153 | −2.2E−05 | 1.5E−06 |
| S5 | 0 | 0.043495 | −0.06762 | 0.068699 | −0.04376 | 0.016992 | −0.00368 | 0.000339 |
| S6 | 0 | 0.016368 | −0.06684 | 0.071071 | −0.04915 | 0.021045 | −0.00513 | 0.000535 |
| S7 | 0 | −0.02931 | −0.01066 | 0.00841 | −0.00604 | 0.00291 | −0.00093 | 0.000127 |
| S8 | 0 | −0.00829 | 0.01206 | −0.01669 | 0.012819 | −0.00602 | 0.001512 | −0.00016 |
| S9 | 0 | −0.01149 | −0.00509 | 0.016507 | −0.01336 | 0.00534 | −0.00122 | 0.00012 |
| S10 | 0 | 0.03457 | −0.01738 | 0.027885 | −0.02673 | 0.016974 | −0.00579 | 0.000754 |
| S11 | −16.1606 | 0.040728 | 0.006588 | 0.027873 | −0.06244 | 0.053333 | −0.01911 | 0.002337 |
| S12 | 0 | −0.01171 | −0.00187 | 0.028796 | −0.04628 | 0.032284 | −0.0104 | 0.001257 |
| S13 | 0 | 0.01756 | −0.05605 | 0.078565 | −0.06545 | 0.031906 | −0.00889 | 0.001138 |
| S14 | 0 | 0.055106 | −0.06528 | 0.115503 | −0.12469 | 0.073798 | −0.02294 | 0.002887 |
| S15 | 0 | 0.026847 | −0.04368 | 0.166733 | −0.20533 | 0.118527 | −0.033 | 0.003535 |
| S16 | 0 | 0.026847 | −0.04368 | 0.166733 | −0.20533 | 0.118527 | −0.033 | 0.003535 |
| S17 | 0 | −0.03108 | −0.03014 | 0.15812 | −0.20478 | 0.123317 | −0.03558 | 0.003958 |

Figure 4:
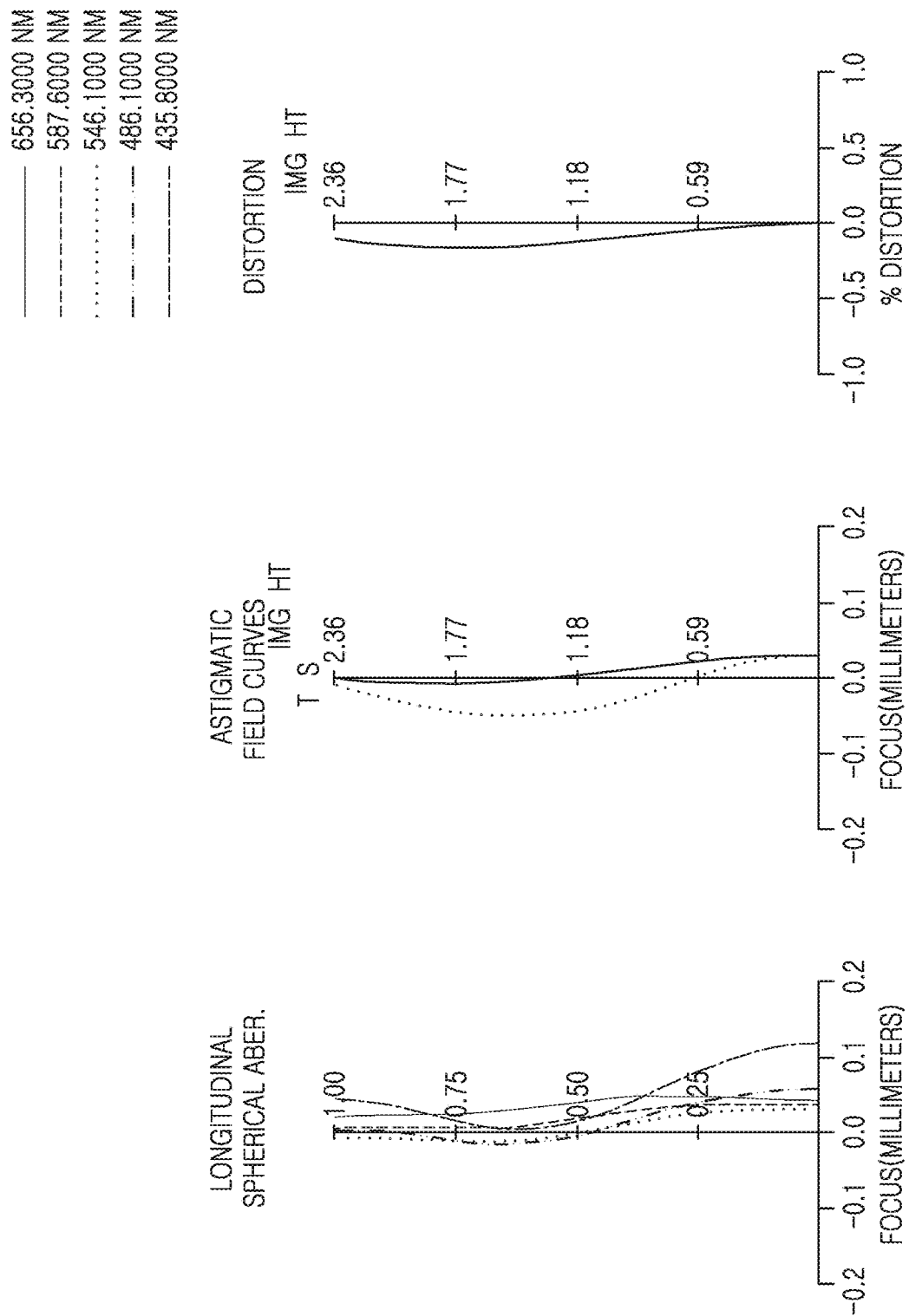
FIG. 4 is a curve illustrating aberration characteristics of the optical imaging system illustrated in FIG. 3.

In addition, the optical system configured as described above may have aberration characteristics as illustrated in FIG. 4.

Figure 5:
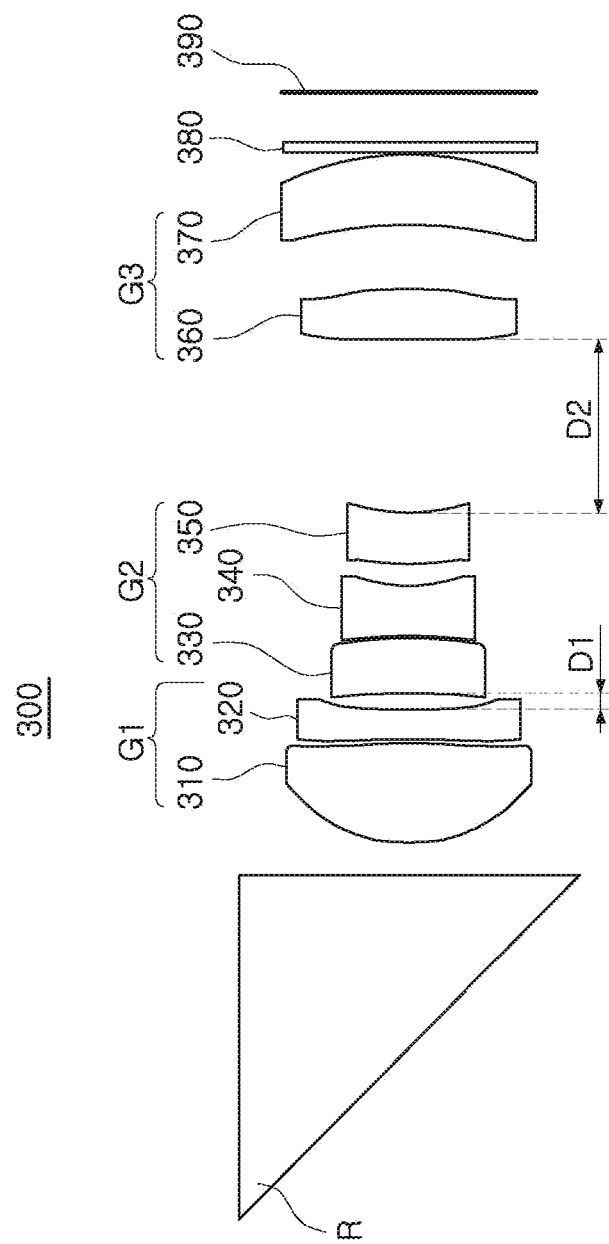
FIG. 5 is a configuration diagram of an optical imaging system according to a third embodiment of the present disclosure.

An optical imaging system according to a third embodiment of the present disclosure will be described with reference to FIGS. 5 and 6.

The optical imaging system 300 according to the third embodiment of the present disclosure may include a first lens group G1, a second lens group G2, and a third lens group G3.

The first lens group G1 may include a first lens 310 and a second lens 320, the second lens group G2 may include a third lens 330, a fourth lens 340, and a fifth lens 350, and the third lens group G3 may include a sixth lens 360 and a seventh lens 370. In addition, the optical imaging system may further include a filter 380 and an image sensor 390.

In addition, a reflective member R disposed closer to an object side than the first lens 310 and having a reflective surface changing an optical path may be further included. In the third embodiment of the present disclosure, the reflective member R may be a prism, but may also be provided as a mirror.

Light incident on the reflective member R may be bent by the reflective member R to pass through the first lens group G1 to the third lens group G3.

At least one of the first lens group G1 to the second lens group G2 may be moved to change the overall focal length of the optical imaging system. For example, the second lens group G2 in the optical axis direction may be moved to change a distance between the first lens group G1 and the second lens group G2, and a distance between the second lens group G2 and the third lens groups G3.

Lens characteristics of each lens (radius of curvature, a thickness of a lens or a distance between lenses, a refractive index, Abbe number, a focal length) are illustrated in the following Table 7.

TABLE 7

| Surface No. | Remarks | Curvature Radius | Thickness or Distance | Refracfive Index | Abbe No. | Maximum Effective Radius | Focal Length |
|---|---|---|---|---|---|---|---|
| S1 | Prism | Infinity | 3.5 | 1.723 | 29.500 | 3.438 | |
| S2 | | Infinity | 3.5 | 1.723 | 29.500 | | |
| S3 | | Infinity | 0.5 | | | 2.654 | |
| S4 | 1$^{st}$ Lens | 3.25418404 | 2.000 | 1.536 | 55.656 | 2.350 | 4.960558 |
| S5 | | −11.423038 | 0.081 | | | 2.033 | |
| S6 | 2$^{nd}$ Lens | −20.496781 | 0.604 | 1.667 | 20.353 | 1.959 | −14.1075 |
| S7 | | 17.5971874 | D1 | | | 1.690 | |
| S8 | 3$^{rd}$ Lens | −21.668144 | 1.132 | 1.645 | 23.528 | 1.550 | 23.29601 |
| S9 | | −9.0510737 | 0.047 | | | 1.371 | |
| S10 | 4$^{th}$ Lens | −7.3373648 | 1.000 | 1.536 | 55.656 | 1.350 | −4.62828 |
| S11 | | 3.92679959 | 0.444 | | | 1.090 | |
| S12 | 5$^{th}$ Lens | 5.09546938 | 1.000 | 1.667 | 20.353 | 1.050 | −15.9613 |
| S13 | | 3.17540013 | D2 | | | 1.234 | |
| S14 | 6$^{th}$ Lens | −365.41077 | 1.000 | 1.536 | 55.656 | 2.101 | 12.74176 |
| S15 | | −6.7113546 | 1.272 | | | 2.158 | |
| S16 | 7$^{th}$ Lens | −21.396264 | 1.427 | 1.667 | 20.353 | 2.341 | 67.02887 |
| S17 | | −14.856589 | 0.030 | | | 2.597 | |
| S18 | Filter | Infinity | 0.210 | 1.518 | 64.197 | 2.598 | |
| S19 | | Infinity | 0.990 | | | 2.599 | |

TABLE 7-continued

| Surface No. | Remarks | Curvature Radius | Thickness or Distance | Refractive Index | Abbe No. | Maximum Effective Radius | Focal Length |
|---|---|---|---|---|---|---|---|
| S20 | Imaging Surface | Infinity | | | | 2.601 | |

TABLE 8

| | 1st Position | 2nd Position |
|---|---|---|
| D1 | 0.300 | 0.643 |
| D2 | 3.510 | 0.502 |

In the optical imaging system according to the third embodiment of the present disclosure, IMG HT is 2.6 mm, a is 91.146°, and AL1 is 14.09 mm².

TABLE 9

| | K | A | B | C | D | E | F | G | H | J |
|---|---|---|---|---|---|---|---|---|---|---|
| S4 | 0.031739 | 0.00033 | 0.000212 | −8E−05 | 1.86E−05 | 5.26E−06 | −3.7E−06 | 8.57E−07 | −9.4E−08 | 4.16E−09 |
| S5 | 5.705919 | 0.009684 | −0.00272 | 0.001173 | −0.00025 | 2.77E−05 | −1.8E−06 | 6.38E−08 | −1.2E−09 | 8.64E−12 |
| S6 | 58.51844 | 0.005321 | −0.00288 | 0.003515 | −0.00238 | 0.001154 | −0.00037 | 7.1E−05 | −7.5E−06 | 3.26E−07 |
| S7 | 59 | 0.002328 | −0.0026 | 0.008937 | −0.01025 | 0.007232 | −0.00314 | 0.00081 | −0.00011 | 6.56E−06 |
| S8 | 58.76548 | 0.006866 | −0.0026 | 0.001781 | −0.00108 | 0.000394 | −8.1E−05 | 9.22E−06 | −5.4E−07 | 1.26E−08 |
| S9 | −7.31452 | 0.003653 | 0.006233 | −0.0787 | 0.214516 | −0.30008 | 0.242323 | −0.11449 | 0.029499 | −0.00321 |
| S10 | −37.3779 | −0.00491 | 0.020745 | −0.10958 | 0.287827 | −0.40832 | 0.337062 | −0.16319 | 0.043141 | −0.00482 |
| S11 | 3.761819 | −0.01649 | 0.023856 | −0.01076 | 0.002678 | −0.0004 | 3.58E−05 | −1.9E−06 | 5.8E−08 | −7.3E−10 |
| S12 | −7.69428 | −0.04149 | 0.013365 | 0.000862 | −0.00681 | 0.006043 | −0.0028 | 0.000684 | −8.3E−05 | 3.98E−06 |
| S13 | −14.2003 | 0.009816 | −0.02343 | 0.027344 | −0.03542 | 0.043873 | −0.04072 | 0.024149 | −0.00802 | 0.00113 |
| S14 | 0 | 6.06E−05 | 0.001464 | −6.6E−05 | −1.8E−06 | 2.11E−07 | −6.6E−09 | 1.02E−10 | −8E−13 | 2.53E−15 |
| S15 | −5.36096 | −0.00414 | 0.003098 | 0.000127 | −0.00081 | 0.0006 | −0.00023 | 4.9E−05 | −5.5E−06 | 2.58E−07 |
| S16 | 0 | −0.01646 | 0.006415 | −0.00212 | 0.000609 | −0.00013 | 2.37E−05 | −3.8E−06 | 4.39E−07 | −2.3E−08 |
| S17 | 13.25315 | −0.02424 | 0.00881 | −0.00308 | 0.000955 | −0.00023 | 3.99E−05 | −4.8E−06 | 3.43E−07 | −1.1E−08 |

In the optical imaging system at the first position, the total focal length f is 17 mm, Fno is 3.8, and FOV is 16.8908°.

In the optical imaging system at the second position, the total focal length f is 13 mm, Fno is 2.8, and FOV is 22.1034°.

In the third embodiment of the present disclosure, the first lens group G1 has positive refractive power as a whole, the second lens group G2 has negative refractive power as a whole, and the third lens group G3 has positive refractive power as a whole. A focal length of the first lens group G1 is 6.674 mm, a focal length of the second lens group G2 is −3.773 mm, and a focal length of the third lens group G3 is 11.247 mm.

The first lens 310 has positive refractive power, and first and second surfaces of the first lens 310 are convex.

The second lens 320 has negative refractive power, and first and second surfaces of the second lens 320 are concave.

The third lens 330 has positive refractive power, a first surface of the third lens 330 is concave, and a second surface of the third lens 330 is convex.

The fourth lens 340 has negative refractive power, and first and second surfaces of the fourth lens 340 are concave.

The fifth lens 350 has negative refractive power, a first surface of the fifth lens 350 is convex, and a second surface of the fifth lens 350 is concave.

The sixth lens 360 has positive refractive power, a first surface of the sixth lens 360 is concave, and a second surface of the sixth lens 360 is convex.

The seventh lens 370 has positive refractive power, a first surface of the seventh lens 370 is concave, and a second surface of the seventh lens 370 is convex.

Respective surfaces of the first lens 310 to the seventh lens 370 have aspheric surface coefficients as illustrated in Table 9. For example, both the object-side surface and the image-side surface of the first lens 310 to the seventh lens 370 are aspheric surfaces.

Figure 6:
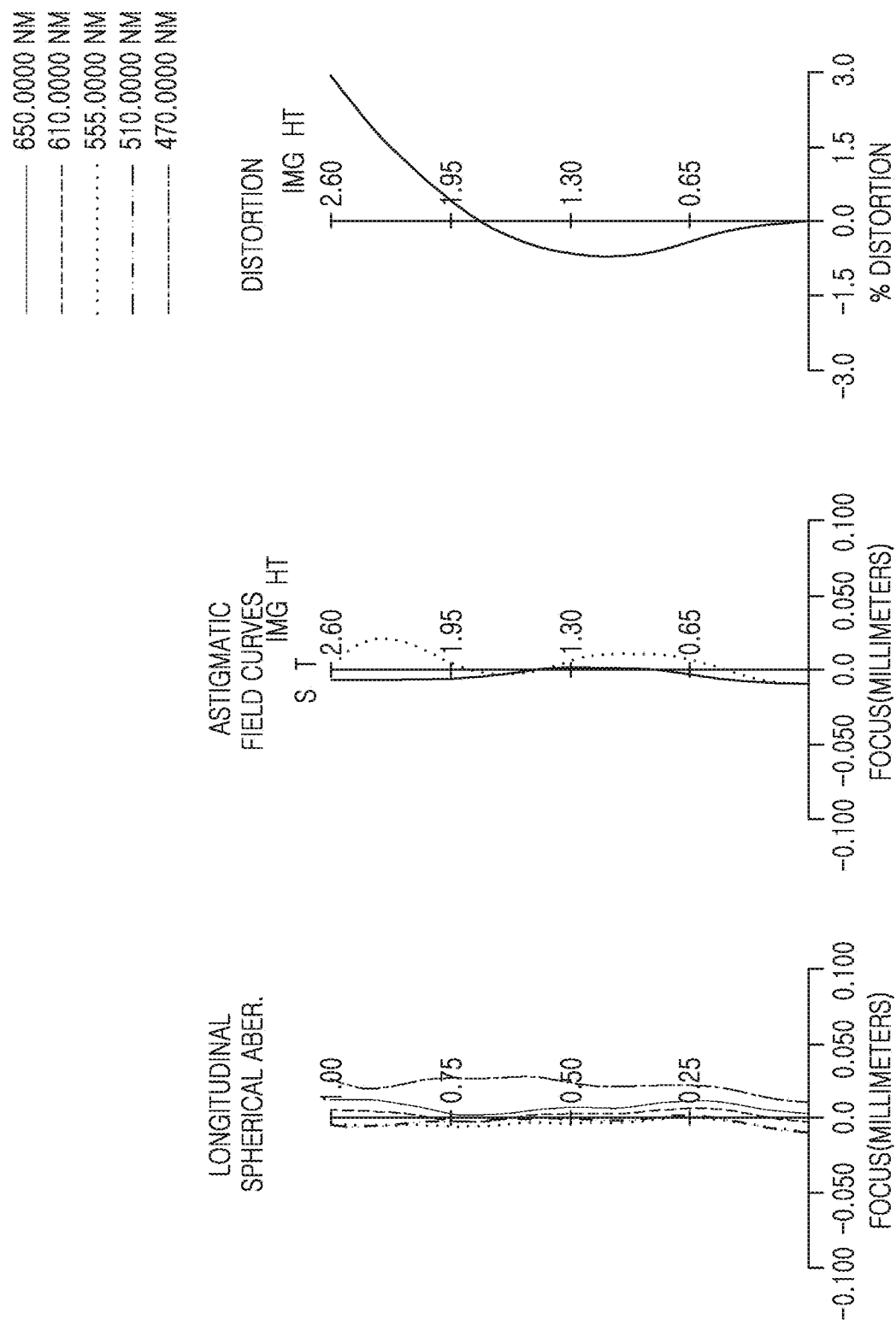
FIG. 6 is a curve illustrating aberration characteristics of the optical imaging system illustrated in FIG. 5.

In addition, the optical system configured as described above may have aberration characteristics as illustrated in FIG. 6.

Figure 7:
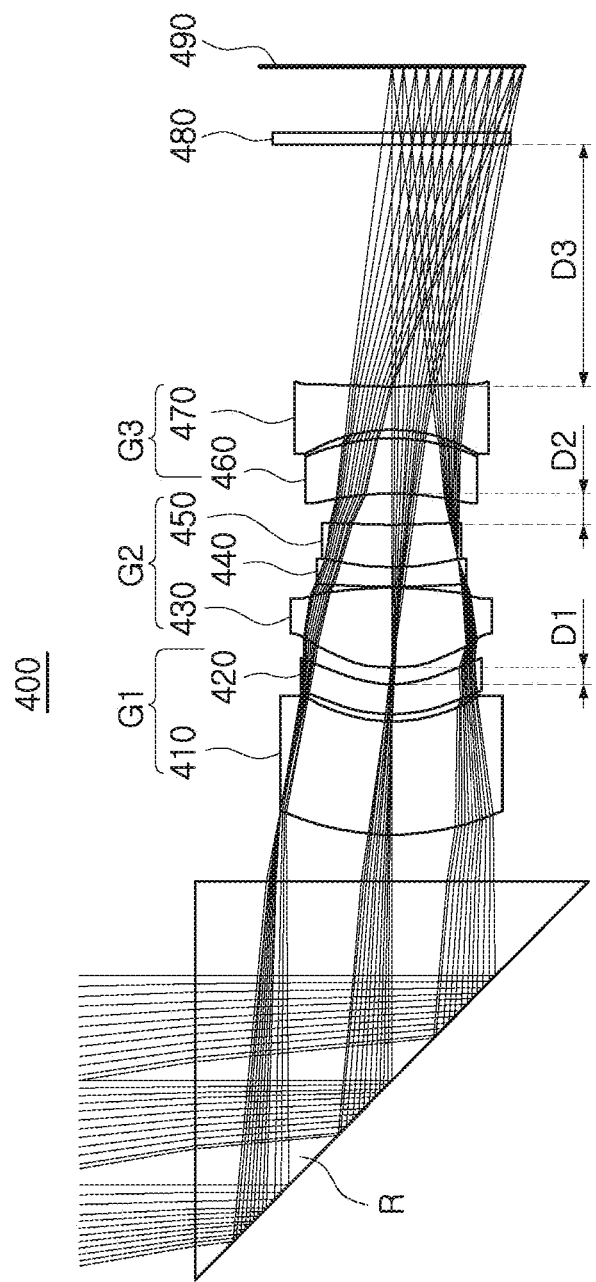
FIG. 7 is a configuration diagram of an optical imaging system according to a fourth embodiment of the present disclosure.

An optical imaging system according to a fourth embodiment of the present disclosure will be described with reference to FIGS. 7 and 8.

The optical imaging system 400 according to the fourth embodiment of the present disclosure may include a first lens group G1, a second lens group G2, and a third lens group G3.

The first lens group G1 may include a first lens 410 and a second lens 420, the second lens group G2 may include a third lens 430, a fourth lens 440, and a fifth lens 450, and the third lens group G3 may include a sixth lens 460 and a seventh lens 470. In addition, the optical imaging system may further include a filter 480 and an image sensor 490.

In addition, a reflective member R disposed closer to an object side than the first lens 410 and having a reflective surface changing an optical path may be further included. In the fourth embodiment of the present disclosure, the reflective member R may be a prism, but may also be provided as a mirror.

Light incident on the reflective member R may be bent by the reflective member R to pass through the first lens group G1 to the third lens group G3.

At least one of the first lens group G1 to the third lens group G3 may be moved to change the overall focal length of the optical imaging system. For example, the second lens group G2 and the third lens group G3 in the optical axis direction may be moved, respectively, to change a distance between the first lens group G1 and the second lens group G2, a distance between the second lens group G2 and the third lens group G3 is varied, and a distance between the third lens group G3 and the image sensor 490.

Lens characteristics of each lens (radius of curvature, a thickness of a lens or a distance between lenses, a refractive index, Abbe number, a focal length) are illustrated in the following Table 10.

whole, and the third lens group G3 has negative refractive power as a whole. A focal length of the first lens group G1 is −21.406 mm, a focal length of the second lens group G2 is 4.38 mm, and a focal length of the third lens group G3 is −6.749 mm.

The first lens 410 has negative refractive power, a first surface of the first lens 410 is convex, and a second surface of the first lens 410 is concave.

TABLE 10

| Surface No. | Remarks | Curvature Radius | Thickness or Distance | Refractive Index | Abbe No. | Maximum Effective Radius | Focal Length |
|---|---|---|---|---|---|---|---|
| S1 | Prism | Infinity | 3.5 | 1.723 | 29.500 | 3.488 | |
| S2 | | Infinity | 3.5 | 1.723 | 29.500 | 2.921 | |
| S3 | | Infinity | 0.8 | | | 2.354 | |
| S4 | 1st Lens | 4.8689049 | 1.994 | 1.546 | 56.114 | 2.000 | −59.4658 |
| S5 | | 3.62173711 | 0.116 | | | 1.606 | |
| S6 | 2nd Lens | 2.60002888 | 0.528 | 1.667 | 20.353 | 1.604 | −30.3794 |
| S7 | | 2.1174067 | D1 | | | 1.534 | |
| S8 | 3rd Lens | 2.43338118 | 1.394 | 1.546 | 56.114 | 1.800 | 3.707096 |
| S9 | | −9.6505006 | 0.030 | | | 1.413 | |
| S10 | 4th Lens | −15.678798 | 0.300 | 1.667 | 20.353 | 1.313 | −9.48265 |
| S11 | | 10.7285859 | 0.030 | | | 1.205 | |
| S12 | 5th Lens | 7.98602466 | 0.744 | 1.546 | 56.114 | 1.200 | 20.00652 |
| S13 | | 28.6477292 | D2 | | | 1.241 | |
| S14 | 6th Lens | −4.8839204 | 1.000 | 1.667 | 20.353 | 1.413 | 8.028849 |
| S15 | | −2.7672977 | 0.134 | | | 1.533 | |
| S16 | 7th Lens | −3.0550594 | 0.765 | 1.546 | 56.114 | 1.533 | −3.84162 |
| S17 | | 7.30594698 | D3 | | | 1.738 | |
| S18 | Filter | Infinity | 0.210 | 1.518 | 64.197 | 2.109 | |
| S19 | | Infinity | 1.173 | | | 2.134 | |
| S20 | Imaging Surface | Infinity | | | | 2.350 | |

TABLE 11

| | 1st Position | 2nd Position |
|---|---|---|
| D1 | 0.300 | 2.983 |
| D2 | 0.514 | 1.831 |
| D3 | 4.221 | 0.224 |

In the optical imaging system according to the fourth embodiment of the present disclosure, IMG HT is 2.35 mm, a is 91.146°, and AL1 is 10.20 mm$^2$.

In the optical imaging system at the first position, the total focal length f is 14 mm, Fno is 4.1, and FOV is 18.7995°.

In the optical imaging system at the second position, the total focal length f is 8 mm, Fno is 2.8, and FOV is 31.979°.

In the fourth embodiment of the present disclosure, the first lens group G1 has negative refractive power as a whole, the second lens group G2 has positive refractive power as a The second lens 420 has negative refractive power, a first surface of the second lens 420 is convex, and a second surface of the second lens 420 is concave.

The third lens 430 has positive refractive power, and first and second surfaces of the third lens 430 are convex.

The fourth lens 440 has negative refractive power, and first and second surfaces of the fourth lens 440 are concave.

The fifth lens 450 has positive refractive power, a first surface of the fifth lens 450 is convex, and a second surface of the fifth lens 450 is concave.

The sixth lens 460 has positive refractive power, a first surface of the sixth lens 460 is concave, and a second surface of the sixth lens 460 is convex.

The seventh lens 470 has negative refractive power, and first and second surfaces of the seventh lens 470 are concave.

Respective surfaces of the first lens 410 to the seventh lens 470 have aspheric surface coefficients as illustrated in Table 12. For example, both the object-side surface and the image-side surface of the first lens 410 to the seventh lens 470 are aspheric surfaces.

TABLE 12

| | K | A | B | C | D | E | F | G |
|---|---|---|---|---|---|---|---|---|
| S4 | −11.8837 | 0.01441 | −0.0032 | 0.000837 | −0.00018 | 2.2E−05 | −6E−07 | −8.2E−08 |
| S5 | 0 | 0.024766 | −0.01887 | 0.017873 | −0.01561 | 0.008554 | −0.00248 | 0.000286 |
| S6 | 0 | −0.00582 | −0.01116 | 0.010063 | −0.01143 | 0.007302 | −0.00233 | 0.000286 |
| S7 | 0 | −0.03675 | 0.00808 | −0.01428 | 0.010027 | −0.00389 | 0.000685 | −3.5E−05 |
| S8 | 0 | −0.00421 | 0.001615 | −0.00564 | 0.005623 | −0.00328 | 0.000968 | −0.00012 |
| S9 | 0 | −0.01164 | −0.00545 | 0.022144 | −0.02295 | 0.012424 | −0.00365 | 0.000438 |
| S10 | 0 | 0.033383 | −0.01622 | 0.038067 | −0.0487 | 0.036219 | −0.01379 | 0.002052 |
| S11 | −55.4169 | 0.049004 | −0.01431 | 0.044646 | −0.05833 | 0.035015 | −0.00538 | −0.00116 |
| S12 | 0 | −0.01336 | −0.00582 | 0.022157 | −0.01645 | −0.00812 | 0.014119 | −0.00441 |
| S13 | 0 | 0.005399 | −0.00501 | 0.00432 | −0.00062 | −0.00255 | 0.000524 | 0.000248 |
| S14 | 0 | 0.028485 | 0.003252 | −0.00119 | −0.00582 | 0.006387 | −0.00363 | 0.000766 |
| S15 | 0 | 0.011308 | 0.055635 | −0.02099 | −0.04244 | 0.052059 | −0.02276 | 0.003557 |

TABLE 12-continued

| | K | A | B | C | D | E | F | G |
|---|---|---|---|---|---|---|---|---|
| S16 | 0 | −0.07162 | 0.114214 | −0.07519 | −0.01932 | 0.052773 | −0.02542 | 0.004033 |
| S17 | 0 | −0.05833 | 0.049011 | −0.04512 | 0.028911 | −0.01099 | 0.002313 | −0.00021 |

Figure 8:
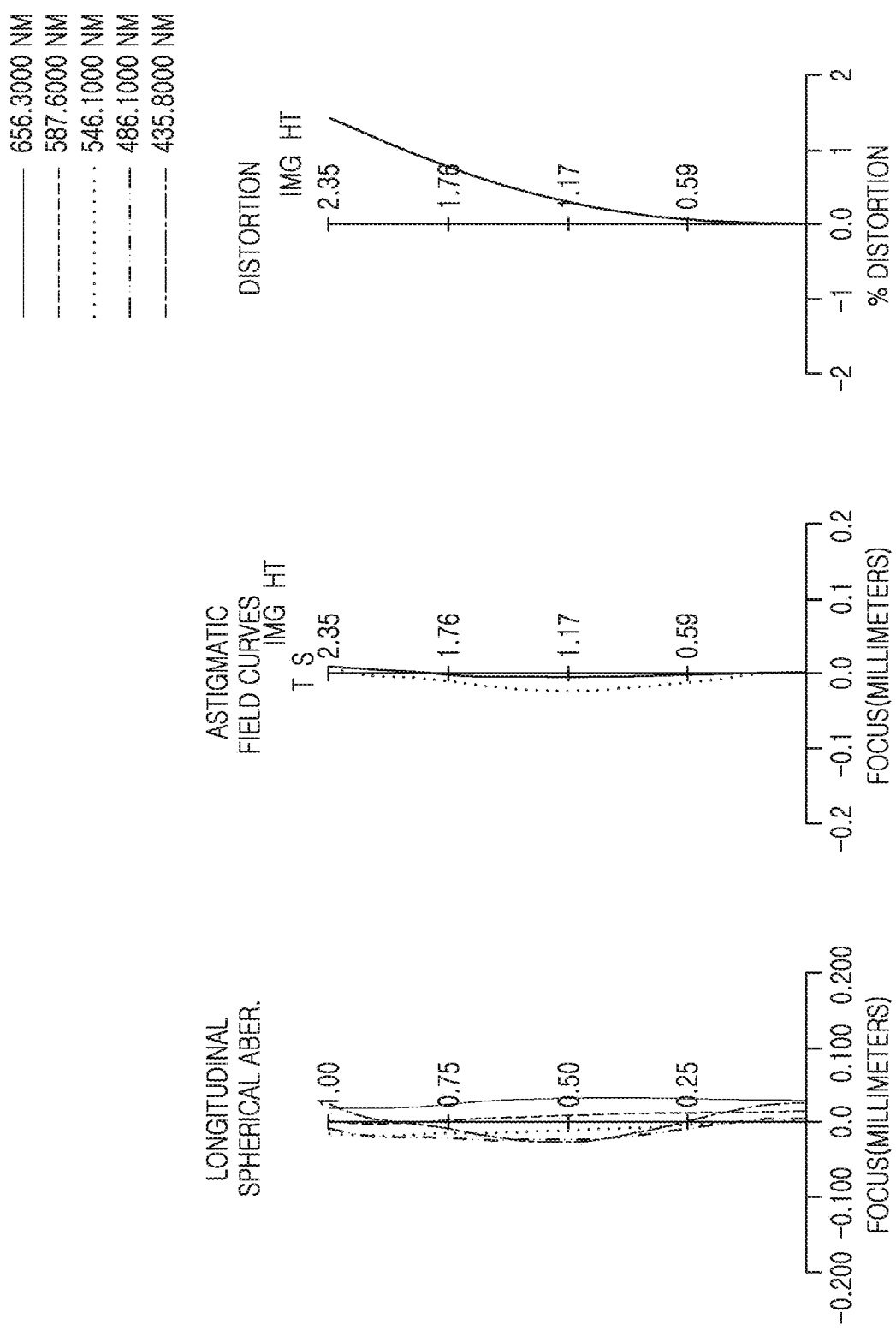
FIG. 8 is a curve illustrating aberration characteristics of the optical imaging system illustrated in FIG. 7.

In addition, the optical system configured as described above may have aberration characteristics as illustrated in FIG. 8.

Figure 9:
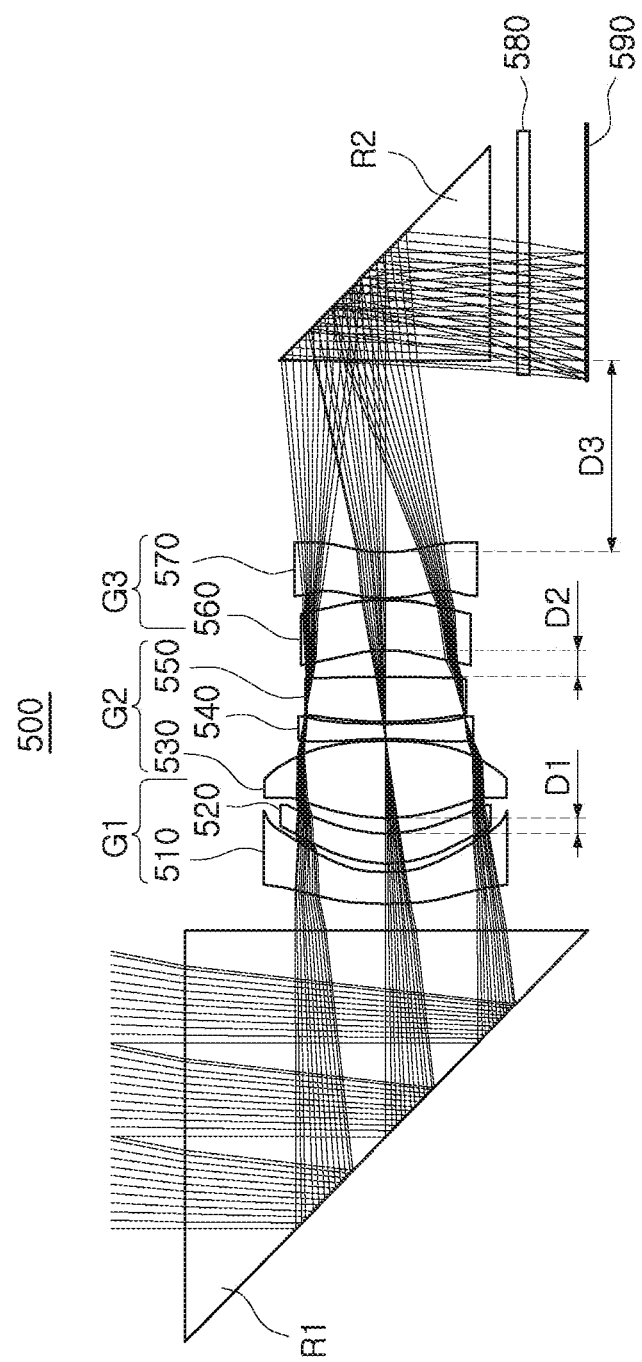
FIG. 9 is a configuration diagram of an optical imaging system according to a fifth embodiment of the present disclosure.

An optical imaging system according to a fifth embodiment of the present disclosure will be described with reference to FIGS. 9 and 10.

The optical imaging system 500 according to the fifth embodiment of the present disclosure may include a first lens group G1, a second lens group G2, and a third lens group G3.

The first lens group G1 may include a first lens 510 and a second lens 520, the second lens group G2 may include a third lens 530, a fourth lens 540, and a fifth lens 550, and the third lens group G3 may include a sixth lens 560 and a seventh lens 570. In addition, the optical imaging system may further include a filter 580 and an image sensor 590.

In addition, a first reflective member R1 disposed closer to an object side than the first lens 510 and having a reflective surface changing an optical path may be further included. In addition, a second reflective member R2 disposed between the seventh lens 570 and the filter 580 and having a reflective surface changing an optical path may be further included. In the fifth embodiment of the present disclosure, the first reflective member R1 and the second reflective member R2 may be prisms, but may also be provided as mirrors.

Light incident on the first reflective member R1 may be bent by the first reflective member R1 to pass through the first lens group G1 to the third lens group G3.

Light passing through the first lens group G1 to the third lens group G3 may be bent by the second reflective member R2 and may be received by the image sensor 590.

At least one of the first lens group G to the third lens group G3 may be moved to change the overall focal length of the optical imaging system. For example, the second lens group G2 and the third lens group G3 in the optical axis direction may be moved, respectively, to change a distance between the first lens group G and the second lens group G2, a distance between the second lens group G2 and the third lens group G3, and a distance between the third lens group G3 and the image sensor 590.

Lens characteristics of each lens (radius of curvature, a thickness of a lens or a distance between lenses, a refractive index, Abbe number, a focal length) are illustrated in the following Table 13.

TABLE 13

| Surface No. | Remarks | Curvature Radius | Thickness or Distance | Refractive Index | Abbe No. | Maximum Effective Radius | Focal Length |
|---|---|---|---|---|---|---|---|
| S1 | 1st Prism | Infinity | 3.8 | 1.723 | 29.500 | 3.745 | |
| S2 | | Infinity | 3.8 | 1.723 | 29.500 | 3.745 | |
| S3 | | Infinity | 0.5 | | | 2.452 | |
| S4 | 1st Lens | 5.57453595 | 0.583 | 1.546 | 56.114 | 2.300 | −10.5257 |
| S5 | | 2.72635284 | 0.166 | | | 1.966 | |
| S6 | 2nd Lens | 2.33037191 | 0.556 | 1.667 | 20.353 | 1.973 | 39.34881 |
| S7 | | 2.31225816 | D1 | | | 1.893 | |
| S8 | 3rd Lens | 3.52990382 | 1.423 | 1.546 | 56.114 | 2.300 | 4.249231 |
| S9 | | −5.820172 | 0.030 | | | 1.826 | |
| S10 | 4th Lens | −8.2186106 | 0.300 | 1.667 | 20.353 | 1.650 | −16.0043 |
| S11 | | −35.93616 | 0.030 | | | 1.502 | |
| S12 | 5th Lens | 9.01446797 | 0.823 | 1.546 | 56.114 | 1.500 | 28.21129 |
| S13 | | 21.005677 | D2 | | | 1.527 | |
| S14 | 6th Lens | −2.5379703 | 0.932 | 1.667 | 20.353 | 1.545 | −22.0471 |
| S15 | | −3.5166941 | 0.030 | | | 1.617 | |
| S16 | 7th Lens | 3.11863115 | 0.859 | 1.546 | 56.114 | 1.620 | −145.279 |
| S17 | | 2.70855154 | D3 | | | 1.740 | |
| S18 | 2nd Prism | Infinity | 2.000 | 1.723 | 29.500 | 1.951 | |
| S19 | | Infinity | 2.000 | 1.723 | 29.500 | 2.762 | |
| S20 | Imaging Surface | Infinity | 0.500 | | | 2.178 | |
| S21 | Filter | Infinity | 0.210 | 1.518 | 64.197 | 2.227 | |
| S22 | | Infinity | 1.098 | | | 2.241 | |
| S23 | Imaging Surface | Infinity | | | | 2.350 | |

TABLE 14

| | 1st Position | 2nd Position |
|---|---|---|
| D1 | 0.300 | 2.613 |
| D2 | 0.500 | 1.436 |
| D3 | 3.551 | 0.303 |

In the optical imaging system according to the fifth embodiment of the present disclosure, IMG HT is 2.35 mm, a is 91.146°, and AL1 is 13.49 mm².

In the optical imaging system at the first position, the total focal length f is 12 mm, Fno is 3.5, and FOV is 22.2637°.

In the optical imaging system at the second position, the total focal length f is 8 mm, Fno is 2.7, and FOV is 33.5974°.

In the fifth embodiment of the present disclosure, the first lens group G1 has negative refractive power as a whole, the second lens group G2 has positive refractive power as a whole, and the third lens group G3 has negative refractive power as a whole. A focal length of the first lens group G1 is −12.612 mm, a focal length of the second lens group G2 is 4.699 mm, and a focal length of the third lens group G3 is −17.138 mm.

The first lens 510 has negative refractive power, a first surface of the first lens 510 is convex, and a second surface of the first lens 510 is concave.

The second lens 520 has positive refractive power, a first surface of the second lens 520 is convex, and a second surface of the second lens 520 is concave.

The third lens 530 has positive refractive power, and first and second surfaces of the third lens 530 are convex.

The fourth lens 540 has negative refractive power, a first surface of the fourth lens 540 is concave, and a second surface of the fourth lens 540 is convex.

The fifth lens 550 has positive refractive power, a first surface of the fifth lens 550 is convex, and a second surface of the fifth lens 550 is concave.

The sixth lens 560 has negative refractive power, a first surface of the sixth lens 560 is concave, and a second surface of the sixth lens 560 is convex.

The seventh lens 570 has negative refractive power, a first surface of the seventh lens 570 is convex, and a second surface of the seventh lens 570 is concave.

Respective surfaces of the first lens 510 to the seventh lens 570 have aspheric surface coefficients as illustrated in Table 15. For example, both the object-side surface and the image-side surface of the first lens 510 to the seventh lens 570 are aspheric surfaces.

The first lens group G1 may include a first lens 610 and a second lens 620, the second lens group G2 may include a third lens 630, a fourth lens 640, and a fifth lens 650, and the third lens group G3 may include a sixth lens 660 and a seventh lens 670. In addition, the optical imaging system may further include a filter 680 and an image sensor 690.

In addition, a first reflective member R1 disposed closer to an object side than the first lens 610 and having a reflective surface changing an optical path may be further included. In addition, a second reflective member R2 disposed between the seventh lens 670 and the filter 680 and having a reflective surface changing an optical path may be further included. In the fifth embodiment of the present disclosure, the first reflective member R1 and the second reflective member R2 may be prisms, but may also be provided as mirrors.

Light incident on the first reflective member R1 may be bent by the first reflective member R1 to pass through the first lens group G1 to the third lens group G3.

Light passing through the first lens group G1 to the third lens group G3 may be bent by the second reflective member R2 and may be received by the image sensor 690.

At least one of the first lens group G1 to the third lens group G3 may be moved to change the overall focal length of the optical imaging system. For example, the second lens group G2 and the third lens group G3 in the optical axis

TABLE 15

|   | K | A | B | C | D | E | F | G |
|---|---|---|---|---|---|---|---|---|
| S4 | −17.9977 | 0.027159 | −0.0145 | 0.005213 | −0.00156 | 0.000314 | −3.6E−05 | 1.74E−06 |
| S5 | 0 | 0.049966 | −0.05673 | 0.038932 | −0.01798 | 0.004927 | −0.00073 | 4.47E−05 |
| S6 | 0 | 0.00256 | −0.04055 | 0.033021 | −0.01575 | 0.004307 | −0.00063 | 3.77E−05 |
| S7 | 0 | −0.03447 | −0.01042 | 0.012891 | −0.00728 | 0.002249 | −0.00036 | 2.39E−05 |
| S8 | 0 | −0.00251 | −0.00291 | 0.000761 | −0.00031 | 9.19E−06 | 4.36E−06 | 3.1E−08 |
| S9 | 0 | −0.01127 | 0.020274 | −0.01806 | 0.007894 | −0.00193 | 0.000254 | −1.4E−05 |
| S10 | 0 | 0.003661 | 0.041516 | −0.03589 | 0.016148 | −0.00423 | 0.000632 | −4.2E−05 |
| S11 | 59 | 0.023262 | 0.002418 | 0.025252 | −0.03869 | 0.024516 | −0.00742 | 0.000883 |
| S12 | 0 | −0.00077 | −0.03118 | 0.058709 | −0.05834 | 0.032313 | −0.00927 | 0.001077 |
| S13 | 0 | −0.01301 | −0.00944 | 0.010157 | −0.00511 | 0.001469 | −0.00021 | 1.19E−05 |
| S14 | 0 | 0.08096 | −0.04523 | 0.037781 | −0.02462 | 0.010403 | −0.00248 | 0.000254 |
| S15 | 0 | 0.025727 | −0.00473 | 0.014385 | −0.01641 | 0.008604 | −0.00224 | 0.000235 |
| S16 | 0 | −0.08726 | 0.016987 | 0.008606 | −0.01605 | 0.008996 | −0.00237 | 0.000247 |
| S17 | 0 | −0.08255 | 0.021095 | −0.00464 | −0.00069 | 0.000861 | −0.00024 | 2.31E−05 |

Figure 10:
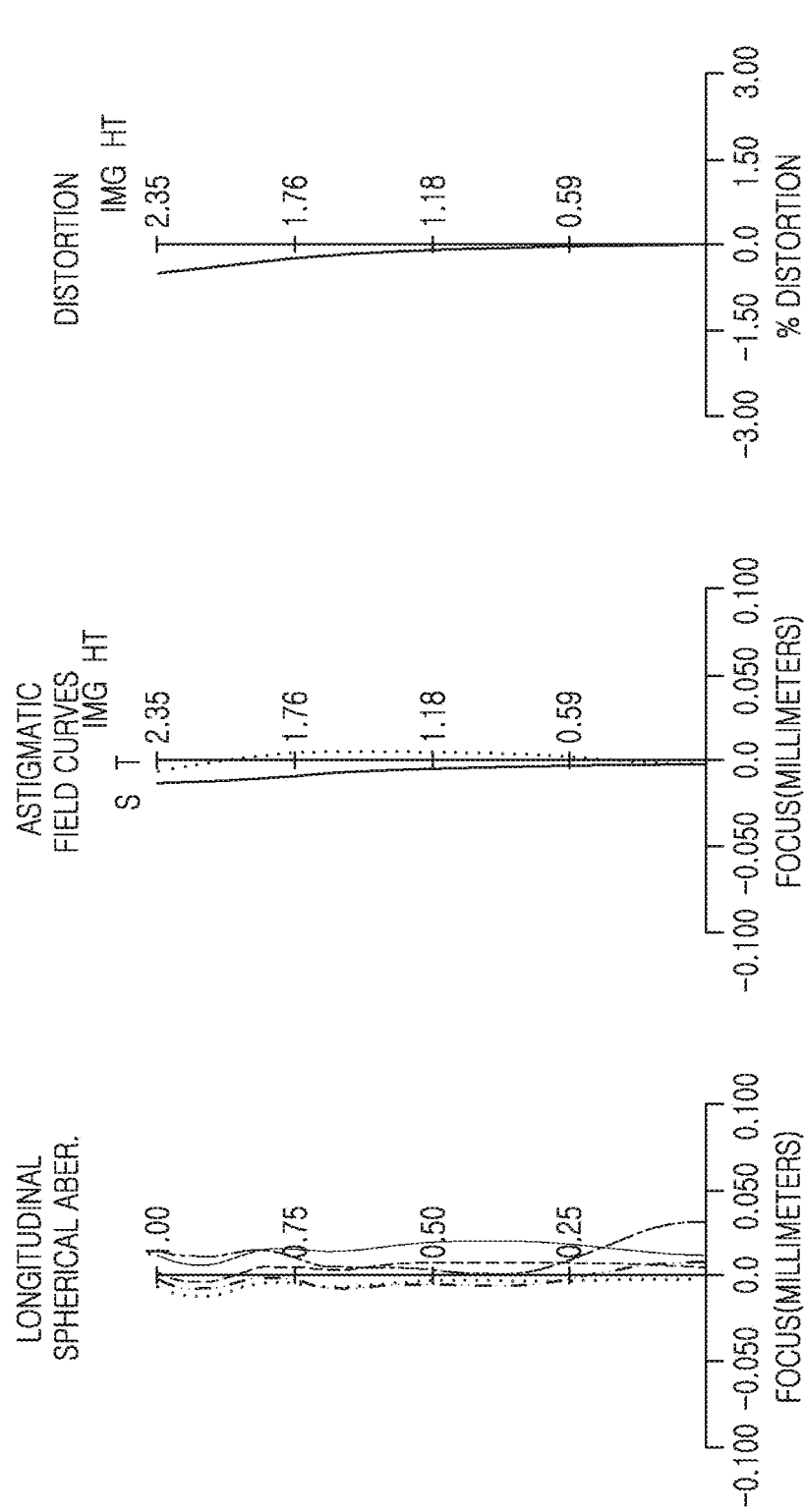
FIG. 10 is a curve illustrating aberration characteristics of the optical imaging system illustrated in FIG. 9.

In addition, the optical system configured as described above may have aberration characteristics as illustrated in FIG. 10.

Figure 11:
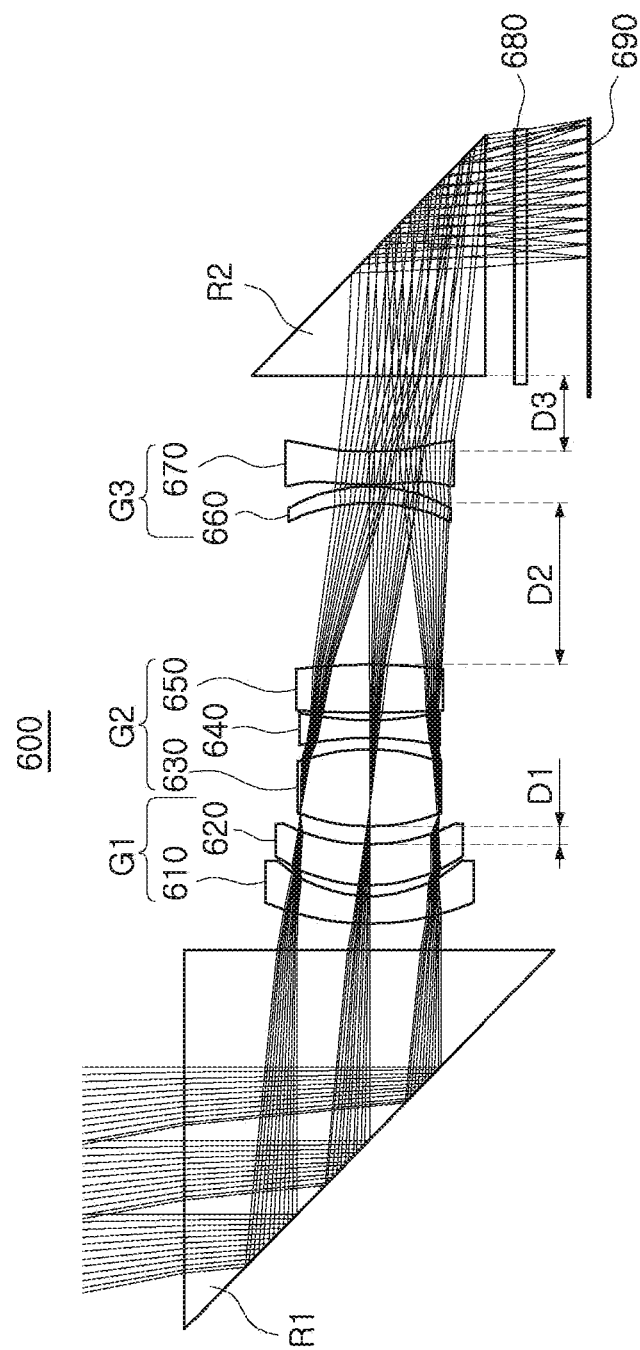
FIG. 11 is a configuration diagram of an optical imaging system according to a sixth embodiment of the present disclosure.

An optical imaging system according to a sixth embodiment of the present disclosure will be described with reference to FIGS. 11 and 12.

The optical imaging system 600 according to the sixth embodiment of the present disclosure may include a first lens group G1, a second lens group G2, and a third lens group G3.

direction may be moved, respectively, to change a distance between the first lens group G and the second lens group G2, a distance between the second lens group G2 and the third lens group G3, and a distance between the third lens group G3 and the image sensor 690.

Lens characteristics of each lens (radius of curvature, a thickness of a lens or a distance between lenses, a refractive index, Abbe number, a focal length) are illustrated in the following Table 16.

TABLE 16

| Surface No. | Remarks | Curvature Radius | Thickness or Distance | Refractive Index | Abbe No. | Maximum Effective Radius | Focal Length |
|---|---|---|---|---|---|---|---|
| S1 | 1st Prism | Infinity | 3.2 | 1.723 | 29.500 | 3.138 | |
| S2 | | Infinity | 3.2 | 1.723 | 29.500 | 2.594 | |
| S3 | | Infinity | 0.5 | | | 2.049 | |

TABLE 16-continued

| Surface No. | Remarks | Curvature Radius | Thickness or Distance | Refractive Index | Abbe No. | Maximum Effective Radius | Focal Length |
|---|---|---|---|---|---|---|---|
| S4 | 1st Lens | 5.26991708 | 0.439 | 1.546 | 56.114 | 1.800 | −9.77139 |
| S5 | | 2.57424975 | 0.181 | | | 1.626 | |
| S6 | 2nd Lens | 2.38619195 | 0.688 | 1.667 | 20.353 | 1.625 | 30.45061 |
| S7 | | 2.39064145 | D1 | | | 1.516 | |
| S8 | 3rd Lens | 3.06397916 | 1.319 | 1.546 | 56.114 | 1.200 | 3.528596 |
| S9 | | −4.4115079 | 0.192 | | | 1.243 | |
| S10 | 4th Lens | −5.5170039 | 0.322 | 1.667 | 20.353 | 1.213 | −6.9718 |
| S11 | | 30.7851797 | 0.140 | | | 1.193 | |
| S12 | 5th Lens | 35.808245 | 0.772 | 1.642 | 23.902 | 1.200 | 23.89616 |
| S13 | | −26.592645 | D2 | | | 1.265 | |
| S14 | 6th Lens | −2.29743 | 0.300 | 1.667 | 20.353 | 1.370 | 155.3701 |
| S15 | | −2.3653438 | 0.030 | | | 1.407 | |
| S16 | 7th Lens | 5.26656988 | 0.537 | 1.546 | 56.114 | 1.388 | −145.279 |
| S17 | | 2.92256102 | D3 | | | 1.449 | |
| S18 | 2nd Prism | Infinity | 2.000 | 1.723 | 29.500 | 1.647 | |
| S19 | | Infinity | 2.000 | 1.723 | 29.500 | 1.849 | |
| S20 | Imaging Surface | Infinity | 0.500 | | | 2.051 | |
| S21 | Filter | Infinity | 0.210 | 1.518 | 64.197 | 2.139 | |
| S22 | | Infinity | 1.085 | | | 2.164 | |
| S23 | Imaging Surface | Infinity | | | | 2.350 | |

TABLE 17

| | 1st Position | 2nd Position |
|---|---|---|
| D1 | 0.300 | 4.453 |
| D2 | 2.738 | 1.278 |
| D3 | 1.324 | 1.316 |

In the optical imaging system according to the sixth embodiment of the present disclosure, IMG HT is 2.35 mm, a is 46.308°, and AL1 is 9.9 mm².

In the optical imaging system at the first position, the total focal length f is 13 mm, Fno is 5.2, and FOV is 19.945°.

In the optical imaging system at the second position, the total focal length f is 8 mm, Fno is 4.3, and FOV is 33.6085°.

In the sixth embodiment of the present disclosure, the first lens group G1 has negative refractive power as a whole, the second lens group G2 has positive refractive power as a whole, and the third lens group G3 has negative refractive power as a whole. A focal length of the first lens group G1 is −12.246 mm, a focal length of the second lens group G2 is 5.012 mm, and a focal length of the third lens group G3 is −13.584 mm.

The first lens 610 has negative refractive power, a first surface of the first lens 610 is convex, and a second surface of the first lens 610 is concave.

The second lens 620 has positive refractive power, a first surface of the second lens 620 is convex, and a second surface of the second lens 620 is concave.

The third lens 630 has positive refractive power, and first and second surfaces of the third lens 630 are convex.

The fourth lens 640 has negative refractive power, and first and second surfaces of the fourth lens 640 are concave.

The fifth lens 650 has positive refractive power, and first and second surfaces of the fifth lens 650 are convex.

The sixth lens 660 has positive refractive power, a first surface of the sixth lens 660 is concave, and a second surface of the sixth lens 660 is convex.

The seventh lens 670 has negative refractive power, a first surface of the seventh lens 670 is convex, and a second surface of the seventh lens 670 is concave.

Respective surfaces of the first lens 610 to the seventh lens 670 have aspheric surface coefficients as illustrated in Table 18. For example, both the object-side surface and the image-side surface of the first lens 610 to the seventh lens 670 are aspheric surfaces.

TABLE 18

| | K | A | B | C | D | E | F | G |
|---|---|---|---|---|---|---|---|---|
| S4 | −11.2652 | 0.035636 | −0.02183 | 0.009777 | −0.00344 | 0.000773 | −9.5E−05 | 4.84E−06 |
| S5 | 0 | 0.06072 | −0.07326 | 0.05641 | −0.0288 | 0.008658 | −0.00139 | 8.98E−05 |
| S6 | 0 | 0.004113 | −0.04742 | 0.044158 | −0.02407 | 0.007517 | −0.00125 | 8.32E−05 |
| S7 | 0 | −0.03071 | −0.01414 | 0.019282 | −0.01336 | 0.005137 | −0.00104 | 8.55E−05 |
| S8 | 0 | −0.00484 | 0.002826 | −0.0057 | 0.003917 | −0.00184 | 0.000449 | −4.5E−05 |
| S9 | 0 | −0.02432 | 0.061975 | −0.08052 | 0.059707 | −0.02688 | 0.00685 | −0.00076 |
| S10 | 0 | −0.00159 | 0.074411 | −0.08733 | 0.055892 | −0.02226 | 0.005775 | −0.0008 |
| S11 | 56.3414 | 0.039952 | −0.04317 | 0.112763 | −0.12331 | 0.068094 | −0.01839 | 0.001836 |
| S12 | 0 | 0.008598 | −0.07318 | 0.139136 | −0.13618 | 0.0746 | −0.02232 | 0.002925 |
| S13 | 0 | −0.00817 | −0.00721 | 0.009626 | −0.0079 | 0.003297 | −0.00063 | 4.38E−05 |
| S14 | 0 | 0.081456 | −0.07941 | 0.100564 | −0.0864 | 0.045268 | −0.01287 | 0.001507 |
| S15 | 0 | 0.028242 | −0.01479 | 0.028678 | −0.02874 | 0.014982 | −0.00402 | 0.000443 |
| S16 | 0 | −0.11006 | 0.070426 | −0.05347 | 0.030882 | −0.01279 | 0.003019 | −0.00028 |
| S17 | 0 | −0.07111 | 0.023889 | −0.00706 | −0.00055 | 0.001358 | −0.00048 | 5.95E−05 |

Figure 12:
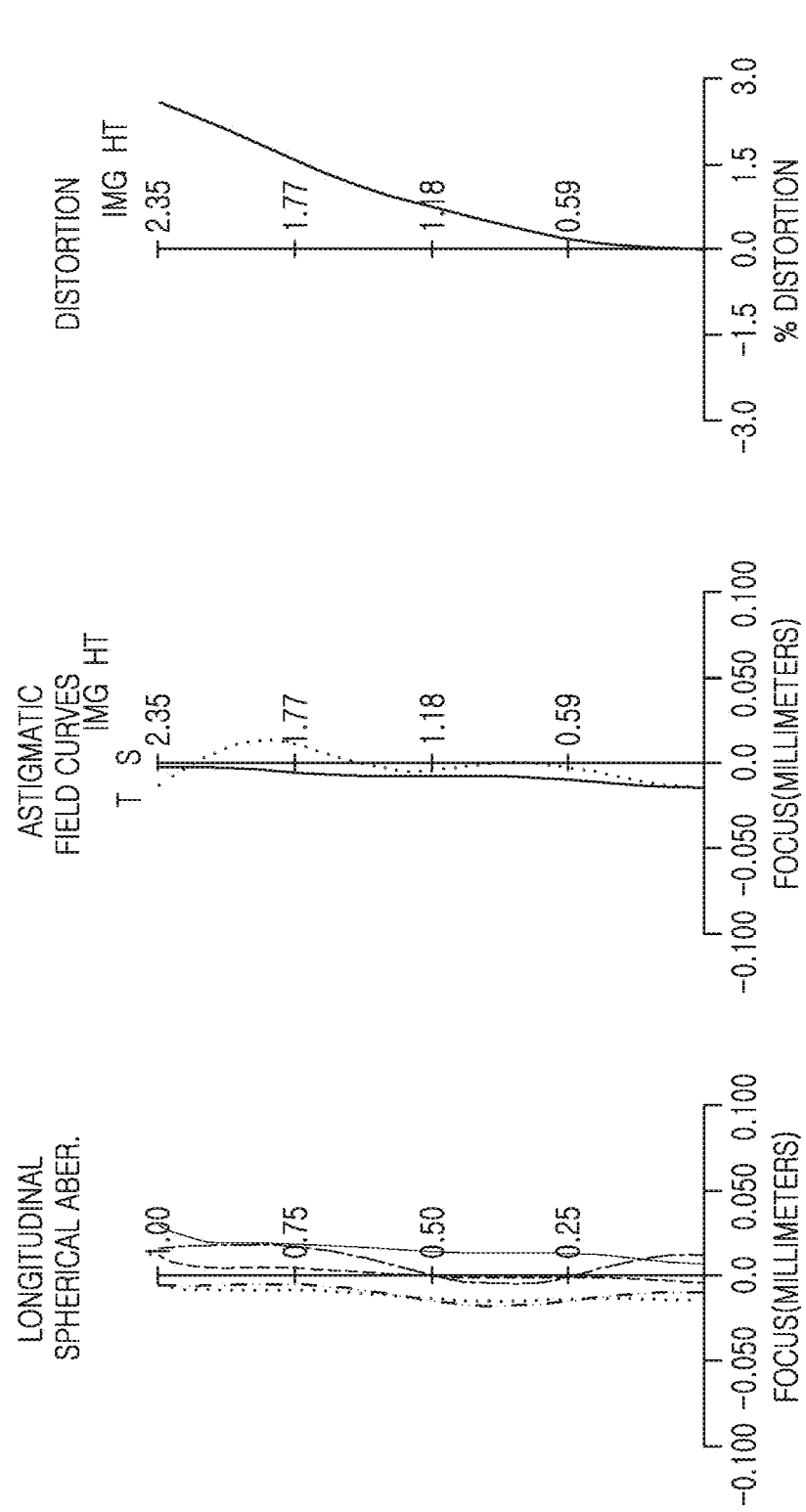
FIG. 12 is a curve illustrating aberration characteristics of the optical imaging system illustrated in FIG. 11.

In addition, the optical system configured as described above may have aberration characteristics as illustrated in FIG. 12.

FIG. 13 is a schematic perspective view of an optical imaging system according to an embodiment of the present disclosure.

Referring to FIG. 13, an optical imaging system according to an embodiment of the present disclosure may include a plurality of lenses L1, L2, L3, L4, and L5, and a spacer S1.

Although not illustrated in the drawings, the optical imaging system may further include a reflective member disposed closer to an object side than the plurality of lenses. In addition, a filter and an image sensor may be further included.

For example, the optical imaging system may be any one of the optical imaging systems according to the first to sixth embodiments described above.

The plurality of lenses L1, L2, L3, L4, and L5 may be arranged to be spaced apart from adjacent lenses.

At least some of the lenses L1, L2, L3, L4, and L5 may have a non-circular planar shape. For example, the first lens L1 and the second lens L2 may be formed to have a non-circular shape, and the third lens L3 to the fifth lens L5 may be formed to have a circular shape. Alternatively, all of the plurality of lenses may be formed to have a non-circular shape.

Figure 16:
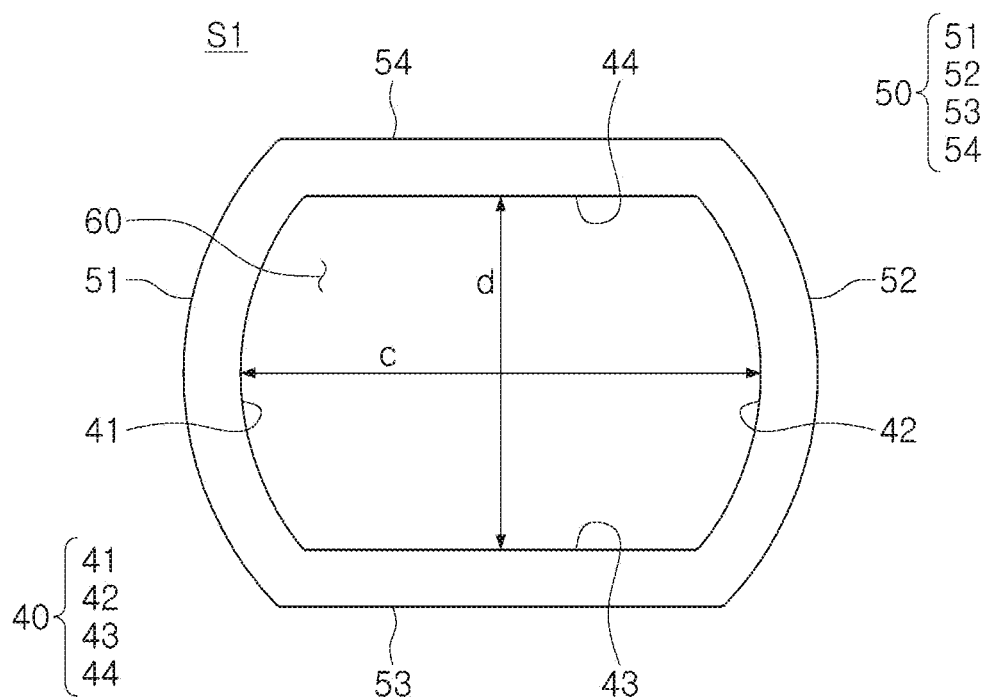
FIG. 16 is a plan view of a first spacer of an optical imaging system according to an embodiment of the present disclosure.

FIG. 16 is a plan view of a first spacer of an optical imaging system according to an embodiment of the present disclosure.

Referring to FIG. 16, a spacer may be provided between lenses adjacent to each other.

The spacer may maintain a distance between the lenses, and may block unnecessary light. For example, the spacer may be provided with a light absorbing layer to block the unnecessary light. The light absorbing layer may be a black film or black iron oxide.

The spacer may include a first spacer S1, a second spacer, a third spacer, and a fourth spacer, arranged from an object side toward an image side.

The first spacer S1 may be disposed between lenses having a non-circular shape. For example, the first spacer S1 may be disposed between a first lens L1 and a second lens L2.

The second spacer may be disposed between the second lens L2 and a third lens L3, the third spacer may be disposed between the third lens L3 and a fourth lens L4, and the fourth spacer may be disposed between the fourth lens L4 and a fifth lens L5. For reference, only the first spacer S1 is illustrated in FIGS. 13 and 16.

The first spacer S1 may have an opening 60 through which light passes. The opening 60 may be formed by an inner peripheral surface 40 of the first spacer S1. For example, a space surrounded by the inner peripheral surface 40 of the first spacer S1 may serve as the opening 60.

An external peripheral surface 50 of the first spacer S1 may be non-circular, when viewed in the optical axis direction, and the inner peripheral surface 40 of the first spacer S1 may be also non-circular, when viewed in the optical axis direction.

The external peripheral surface 50 of the first spacer S1 may correspond to shapes of the first lens L1 and the second lens L2. For example, the external peripheral surface 50 of the first spacer S1 may include a first external surface 51, a second external surface 52, a third external surface 53, and a fourth external surface 54.

The first external surface 51 and the second external surface 52 may have opposite shapes facing each other, and the third external surface 53 and the fourth external surface 54 may have opposite shapes facing each other.

When viewed in the optical axis direction, the first external surface 51 and the second external surface 52 may have an arc shape, and the third external surface 53 and the fourth external surface 54 may have a substantially linear shape.

The third external surface 53 and the fourth external surface 54 may connect the first external surface 51 and the second external surface 52, respectively.

In addition, the third external surface 53 and the fourth external surface 54 may be symmetrical about the optical axis and may be formed parallel to each other.

The inner peripheral surface 40 of the first spacer S1 may include a first internal surface 41, a second internal surface 42, a third internal surface 43, and a fourth internal surface 44.

The first internal surface 41 and the second internal surface 42 may face each other and may have a corresponding shape, and the third internal surface 43 and the fourth internal surface 44 may face each other and may have a corresponding shape.

When viewed in the optical axis direction, the first internal surface 41 and the second internal surface 42 may have an arc shape, and the third internal surface 43 and the fourth internal surface 44 may have a substantially linear shape.

The third internal surface 43 and the fourth internal surface 44 may connect the first internal surface 41 and the second internal surface 42, respectively.

In addition, the third internal surface 43 and the fourth internal surface 44 may be symmetrical about the optical axis, and may be formed parallel to each other.

The inner peripheral surface 50 of the first spacer S1 may have a major axis (c) and a minor axis (d). For example, when viewed in the optical axis direction, a line segment connecting the third internal surface 43 and the fourth internal surface 44 at the shortest distance while passing through the optical axis may be the minor axis (d), and a line segment connecting the first internal surface 41 and the second internal surface 42 while passing through the optical axis and perpendicular to the minor axis (d) may be the major axis (c).

In this case, half of the major axis (c) may be the maximum radius of the opening 60, and half of the minor axis (d) may be the minimum radius of the opening 60.

FIGS. 17 to 20 are rear views of a portable electronic device equipped with a camera module according to various embodiments of the disclosure.

The portable electronic device 1 illustrated in FIGS. 17 to 20 may be a portable electronic device such as a mobile communication terminal equipped with a plurality of camera modules, a smartphone, or a tablet PC.

Each of the plurality of camera modules may include an optical imaging system.

In FIGS. 17 to 20, a camera module 2 may include any one of the optical imaging systems according to the first to sixth embodiments described above.

The camera module 2 may bend a traveling direction of light through a reflective member.

An optical axis of the camera module 2 may face a direction, perpendicular to a thickness direction of the portable electronic device 1 (a Z-axis direction, a direction toward a rear surface of the portable electronic device from a front surface thereof, or vice versa).

For example, the optical axis of the camera module 2 may be formed in a width direction (a Y direction) or a length direction (an X direction) of the portable electronic device 1.

Therefore, even when the camera module 2 has characteristics of a telephoto camera having a relatively long focal length, an increase in thickness of the portable electronic device 1 may be prevented. Therefore, the thickness of the portable electronic device 1 may be minimized.

Figure 17:
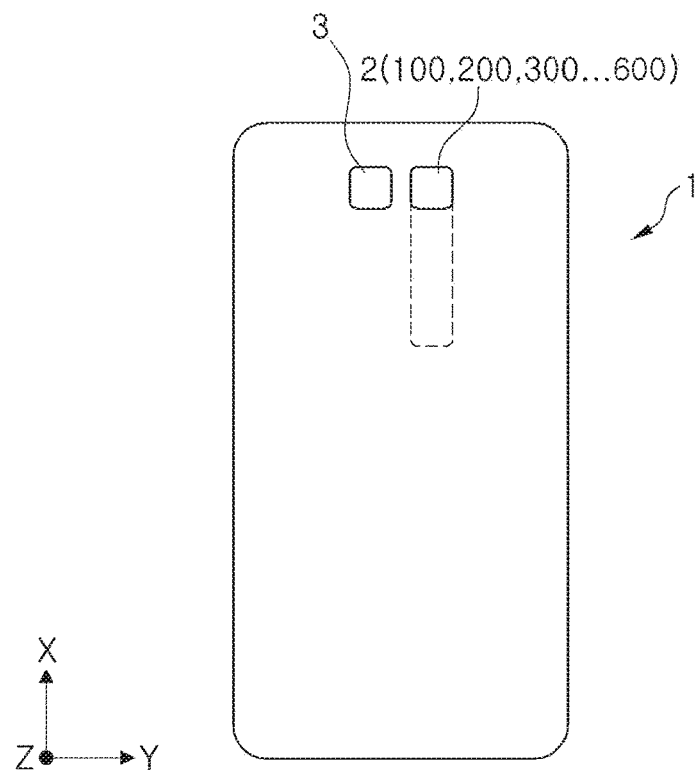
FIGS. 17 to 20 are views of a portable electronic device equipped with a camera module according to an embodiment of the present disclosure.

Referring to FIG. 17, a first camera module 2 and a second camera module 3 may be provided in the portable electronic device 1. For example, the portable electronic device 1 may include a dual camera module.

Optical axes of the first camera module 2 and the second camera module 3 may be formed in different directions. For example, an optical axis of the first camera module 2 may be formed in the X direction, and an optical axis of the second camera module 3 may be formed in the Z direction.

In addition, the first camera module 2 and the second camera module 3 may be configured to have different angles of view and focal lengths.

The first camera module 2 may be configured to have a relatively narrow angle of view and a relatively long focal length (e.g., a telephoto), and the second camera module 3 may be configured to have a relatively wide angle of view and a relatively short focal length (e.g., a wide angle).

As an example, an angle of view of the first camera module 2 may be formed smaller than 30°. For example, an angle of view of the first camera module 2 may be formed to have a range of 10° to 30°. An angle of view of the second camera module 3 may be formed to have a range of 750 to 85°.

The first camera module 2 may be formed to have a range in which Fno satisfies 2.8≤Fno<5. The second camera module 3 may be formed to have a range in which Fno satisfies 1.4≤Fno≤2.4.

The angles of view and focal lengths of the two camera modules may be designed differently to capture an image of a subject at various depths.

Figure 18:
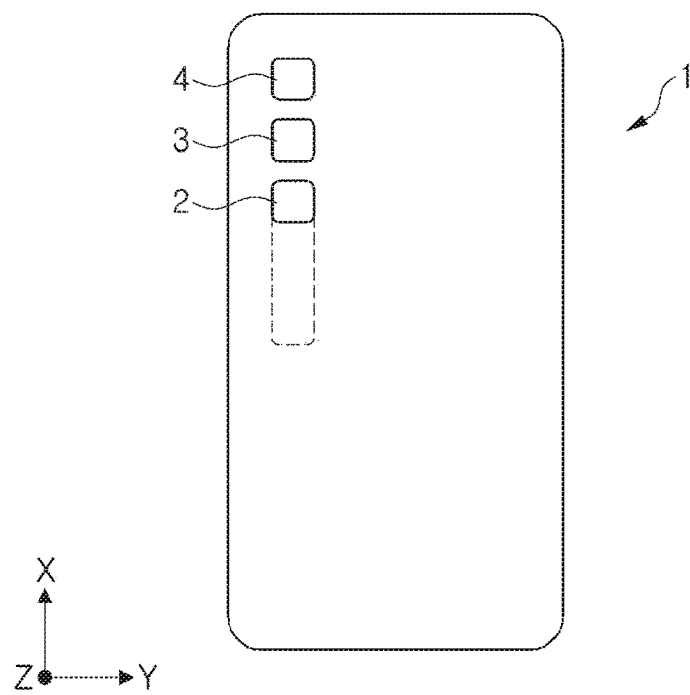

Referring to FIG. 18, a first camera module 2, a second camera module 3, and a third camera module 4 may be provided in the portable electronic device 1. For example, the portable electronic device 1 may include a triple camera module. The first camera module 2 to the third camera module 4 may be arranged in the width direction (the Y direction) or the length direction (the X direction) of the portable electronic device 1.

An optical axis of the first camera module 2 may be formed in a different direction from an optical axis of the second camera module 3 and an optical axis of the third camera module 4. For example, an optical axis of the first camera module 2 may be formed in the X direction, and an optical axis of the second camera module 3 and an optical axis of the third camera module 4 may be formed in the Z direction.

Also, the first camera module 2 to the third camera module 4 may be configured to have different angles of view and focal lengths.

The first camera module 2 may be configured to have the narrowest angle of view and the longest focal length (e.g., a telephoto), and the third camera module 4 may be configured to have the widest angle of view and the shortest focal length (e.g., an ultra wide angle). The second camera module 3 may have a wider angle of view than the first camera module 2 and a narrower angle of view than the third camera module 4 (e.g., a wide angle).

As an example, an angle of view of the first camera module 2 may be formed smaller than 30°. For example, an angle of view of the first camera module 2 may be formed to have a range of 10° to 30°. An angle of view of the second camera module 3 may be formed to have a range of 75° to 85°. An angle of view of the third camera module 4 may be formed to have a range of 1100 to 1500.

The first camera module 2 may be formed to have a range in which Fno satisfies 2.8≤Fno<5. The second camera module 3 may be formed to have a range in which Fno satisfies 1.4≤Fno≤2.4. The third camera module 4 may be formed to have a range in which Fno satisfies 2.0≤Fno≤2.4.

The angles of view and focal lengths of the three camera modules may be designed differently to capture an image of a subject at various depths.

Figure 19:
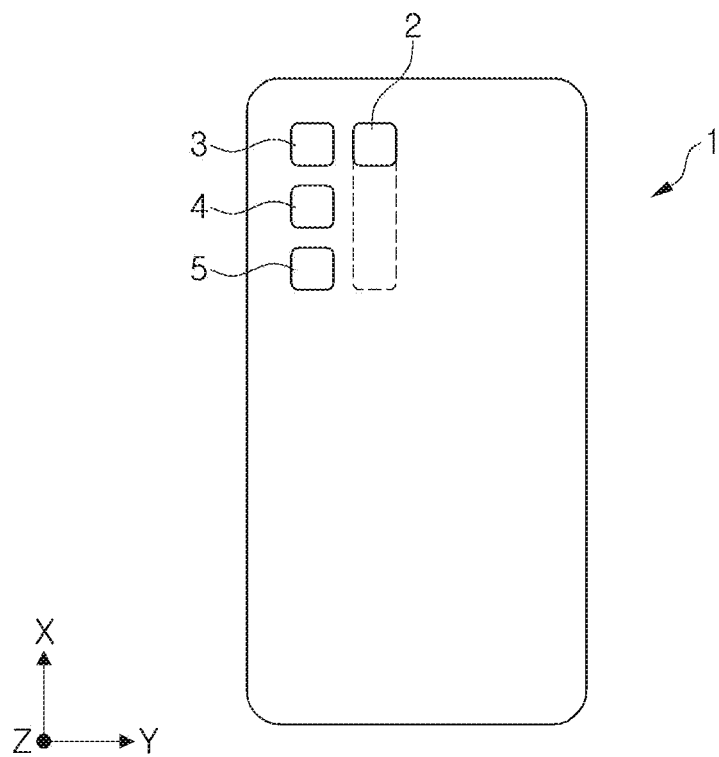

Referring to FIG. 19, a first camera module 2, a second camera module 3, a third camera module 4, and a fourth camera module 5 may be provided in the portable electronic device 1. For example, the portable electronic device 1 may include a quad camera module. The second camera module 3 to the fourth camera module 5 may be arranged in the width direction (the Y direction) or the length direction (the X direction) of the portable electronic device 1, and the first camera module 2 may be disposed next to the second camera module 3 to the fourth camera module 5. Therefore, the first to fourth camera modules 2, 3, 4, and 5 may be arranged in a quadrangular shape as a whole.

An optical axis of the first camera module 2 may be formed in a different direction from optical axes of the second camera module 3 to the fourth camera module 5. For example, the optical axis of the first camera module 2 may be formed in the X direction, and the optical axes of the second camera module 3 to the fourth camera module 5 may be formed in the Z direction.

Also, the first camera module 2 to the fourth camera module 5 may be configured to have different angles of view and focal lengths.

The first camera module 2 may be configured to have the narrowest angle of view and the longest focal length (e.g., a super telephoto), and the fourth camera module 5 may be configured to have the widest angle of view and the shortest focal length (e.g., an ultra wide angle). The second camera module 3 may have a wider angle of view than the first camera module 2 and a narrower angle of view than the third camera module 4 (e.g., a telephoto). The third camera module 4 may have a wider angle of view than the second camera module 3 and a narrower angle of view than the fourth camera module 5 (for example, a wide angle).

As an example, an angle of view of the first camera module 2 may be formed smaller than 30°. For example, an angle of view of the first camera module 2 may be formed to have a range of 10° to 30°. An angle of view of the second camera module 3 may be formed to have a range of 40° to 45°. An angle of view of the third camera module 4 may be formed to have a range of 75° to 85°. An angle of view of the fourth camera module 5 may be formed to have a range of 110° to 150°.

The first camera module 2 may be formed to have a range in which Fno satisfies 2.8≤Fno<5. The second camera module 3 may be formed to have a range in which Fno satisfies 1.8≤Fno≤2.4. The third camera module 4 may be formed to have a range in which Fno satisfies 1.4≤Fno≤2.4. The fourth camera module 5 may be formed to have a range in which Fno satisfies 2.0≤Fno≤2.4.

The angles of view and focal lengths of the four camera modules may be designed differently to capture an image of a subject at various depths.

Figure 20:
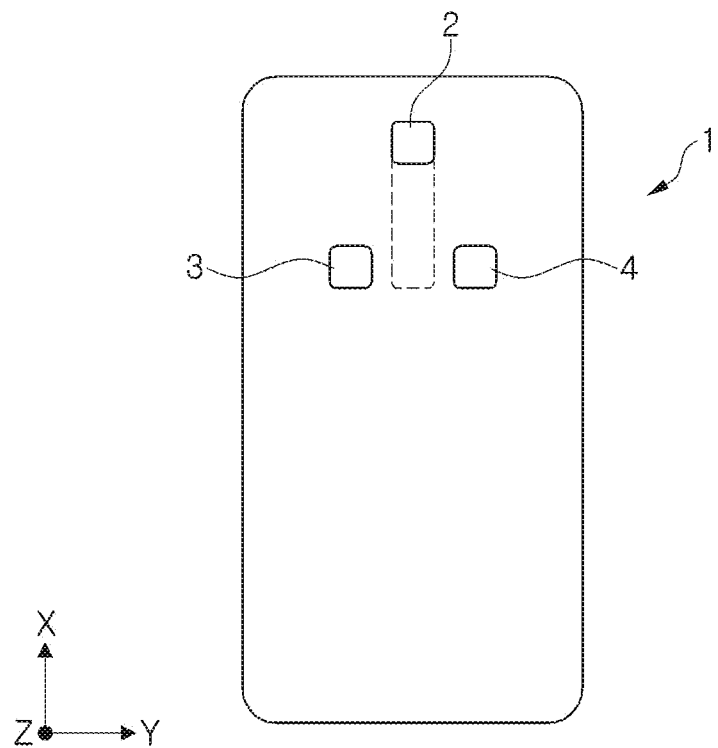

The embodiment illustrated in FIG. 20 may be the same as the embodiment illustrated in FIG. 18, but may be different therefrom, in view of an arrangement form of first to third camera modules 2, 3, and 4.

Referring to FIG. 20, the second camera module 3 and the third camera module 4 may be arranged on both sides of the first camera module 2. The second camera module 3 and the third camera module 4 may be arranged in the width direction (the Y direction) or the length direction (the X direction) of the portable electronic device 1.

The first to third camera modules 2, 3, and 4 may be arranged in a triangular shape as a whole.

An optical imaging system according to an embodiment of the present disclosure may be mounted on a portable electronic device having a relatively small thickness, and may have a relatively long focal length.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
    a first lens group comprising a plurality of lenses and having negative refractive power;
    a second lens group comprising a plurality of lenses and having positive refractive power; and
    a third lens group comprising a plurality of lenses and having negative refractive power,
    wherein the first to third lens groups are arranged in order from an object side,
    wherein at least one of the first lens group to the third lens group is moved on an optical axis to change a distance between the first lens group to the third lens group,
    wherein among the plurality of lenses in the first lens group, a lens disposed closest to the object side has a convex object-side surface,
    wherein among the plurality of lenses in the first lens group, a lens disposed closest to the second lens group has a concave image-side surface,
    wherein among the plurality of lenses in the second lens group, a lens disposed closest to the first lens group has a convex object-side surface and a convex image-side surface,
    wherein among the plurality of lenses in the second lens group, a lens disposed closest to the third lens group has a concave image-side surface,
    wherein the optical imaging system consists of seven lenses, and
    wherein among the plurality of lenses in the third lens group, a lens disposed closer to the second lens group has a positive refractive power, and a lens disposed closer to an image side has a negative refractive power.

2. The optical imaging system of claim 1, wherein among the plurality of lenses in the third lens group, a lens disposed closest to the second lens group has a concave object-side surface.

3. The optical imaging system of claim 2, wherein among the plurality of lenses in the third lens group, a lens disposed closest to an image side has a concave image-side surface.

4. The optical imaging system of claim 1, wherein $0.2<BFL/(2*IMG\ HT)<2.0$ is satisfied, where BFL is a distance on the optical axis from an image-side surface of a lens disposed closest to an image side to an imaging surface, and IMG HT is half a diagonal length of the imaging surface.

5. The optical imaging system of claim 1, wherein $10°<FOV<35°$ is satisfied, where FOV is an angle of view of the optical imaging system.

6. The optical imaging system of claim 1, wherein $2.7 \leq Fno<7$ is satisfied, where Fno is the F-number of the optical imaging system.

7. The optical imaging system of claim 1, further comprising a first reflective member disposed in front of the first lens group,
    wherein the first reflective member has a reflective surface changing a path of light incident on the first reflective member to face the first lens group.

8. The optical imaging system of claim 7, wherein the first reflective member is a prism, and
    wherein $0.4\ mm<DpL1<0.9\ mm$ is satisfied, where DpL1 is a distance between an exit surface of the prism and the lens disposed closest to the object side.

9. The optical imaging system of claim 8, wherein $17.0\ mm<PTTL<22.0\ mm$ is satisfied, where PTTL is a distance from the reflective surface of the prism to an imaging surface along the optical axis.

10. The optical imaging system of claim 1, wherein the third lens group is composed of two lenses.

11. The optical imaging system of claim 10, wherein the lens disposed closer to the second lens group has concave object-side surface and a convex image-side surface.

12. An optical imaging system, comprising:
    a first lens group comprising a plurality of lenses and having negative refractive power;
    a second lens group comprising a plurality of lenses and having positive refractive power; and
    a third lens group comprising a plurality of lenses and having negative refractive power,
    wherein the first to third lens groups are arranged in order from an object side,
    wherein at least one of the first lens group to the third lens group is moved on an optical axis to change a distance between the first lens group to the third lens group,
    wherein among the plurality of lenses in the first lens group, a lens disposed closest to the object side has a convex object-side surface,
    wherein among the plurality of lenses in the first lens group, a lens disposed closest to the second lens group has a concave image-side surface,
    wherein among the plurality of lenses in the second lens group, a lens disposed closest to the first lens group has a convex object-side surface and a convex image-side surface,
    wherein among the plurality of lenses in the second lens group, a lens disposed closest to the third lens group has a concave image-side surface,
    wherein the third lens group is composed of two lenses,
    wherein among the two lenses, a lens disposed closer to the second lens group has a positive refractive power,
    wherein among the two lenses, a lens disposed closer to an image side has a negative refractive power,
    wherein the lens disposed closer to the second lens group has concave object-side surface and a convex image-side surface, and wherein the lens disposed closer to the image side has convex object-side surface and a concave image-side surface.

13. The optical imaging system of claim 9, wherein a length of one axis, among two axes of the lens disposed closest to the object side intersecting the optical axis and perpendicular to each other, is greater than a length of the other axis,
wherein $0 < L1S1el/PTTL < 0.2$ is satisfied, where L1S1el is a maximum effective radius of the object-side surface of the lens disposed closest to the object side.

14. The optical imaging system of claim 9, wherein the lens disposed closest to the object side comprises an optical portion and a flange portion extending around at least a portion of the optical portion,
wherein $0 < AL1/(PTTL)2 < 0.09$ is satisfied, where AL1 is an area of the optical portion of an object-side surface of the lens disposed closest to the object side.

15. The optical imaging system of claim 1, wherein a length of one axis, among two axes of the lens disposed closest to the object side intersecting the optical axis and perpendicular to each other, is greater than a length of the other axis,
wherein $0.7 \leq L1S1es/L1S1el < 0.95$ is satisfied, where L1S1el is a maximum effective radius of the object-side surface of the lens disposed closest to the object side, and L1S1es is a minimum effective radius of the object-side surface of the lens disposed closest to the object side.

16. The optical imaging system of claim 1, wherein the lens disposed closest to the object side comprises an optical portion and a flange portion extending around at least a portion of the optical portion,
wherein the optical portion comprises a first edge, a second edge disposed on an opposite side of the first edge with respect to the optical axis, and a third edge and a fourth edge respectively connecting the first edge and the second edge,
wherein the third edge is disposed on a side opposite to the fourth edge with respect to the optical axis, and
wherein a shortest distance between the first edge and the second edge is greater than a shortest distance between the third edge and the fourth edge.

17. The optical imaging system of claim 16, wherein $45° < \alpha < 93°$ is satisfied, where $\alpha$ is an angle between a first virtual line connecting the optical axis from a connection point of the first edge and the fourth edge, and a second virtual line connecting the optical axis from a connection point of the second edge and the fourth edge.

18. The optical imaging system of claim 16, wherein $1.0 < \alpha/(2*FOV) < 3.0$ is satisfied, where FOV is an angle of view of the optical imaging system, and a is an angle between a first virtual line connecting the optical axis from a connection point of the first edge and the fourth edge, and a second virtual line connecting the optical axis from a connection point of the second edge and the fourth edge.

19. The optical imaging system of claim 1, wherein among the plurality of lenses in the second lens group, the lens disposed closest to the first lens group has a positive refractive power.

20. The optical imaging system of claim 1, wherein the plurality of lenses for the first lens group comprises first and second lenses of the seven lenses,
wherein the plurality of lenses for the second lens group comprises third, fourth, and fifth lenses of the seven lenses, and
wherein the plurality of lenses for the third lens group comprises sixth and seventh lenses of the seven lenses.

* * * * *